(12) United States Patent
Powell

(10) Patent No.: US 10,754,688 B2
(45) Date of Patent: Aug. 25, 2020

(54) SYSTEMS AND METHODS OF A PRODUCTION ENVIRONMENT TOOL

(71) Applicant: WISETECH GLOBAL LIMITED, Alexandria, New South Wales (AU)

(72) Inventor: James Richard Powell, Alexandria (AU)

(73) Assignee: WiseTech Global Limited, Alexandria (AU)

( * ) Notice: Subject to any disclaimer, the term of this patent is extended or adjusted under 35 U.S.C. 154(b) by 283 days.

(21) Appl. No.: 15/753,657

(22) PCT Filed: Nov. 18, 2016

(86) PCT No.: PCT/AU2016/051115
§ 371 (c)(1),
(2) Date: Feb. 20, 2018

(87) PCT Pub. No.: WO2017/083928
PCT Pub. Date: May 26, 2017

(65) Prior Publication Data
US 2020/0104169 A1    Apr. 2, 2020

(30) Foreign Application Priority Data

Nov. 20, 2015  (AU) .................................. 2015904794
May 2, 2016    (AU) .................................. 2016202811

(51) Int. Cl.
*G06F 9/46*    (2006.01)
*G06F 9/48*    (2006.01)

(52) U.S. Cl.
CPC ............ *G06F 9/4887* (2013.01); *G06F 9/485* (2013.01)

(58) Field of Classification Search
None
See application file for complete search history.

(56) References Cited

U.S. PATENT DOCUMENTS

| 2006/0044307 | A1 | 3/2006 | Song |
| 2007/0143169 | A1 | 6/2007 | Grant et al. |
| 2008/0195948 | A1 | 8/2008 | Bauer |
| 2010/0010878 | A1 | 1/2010 | Pinto et al. |

OTHER PUBLICATIONS

PCT International Search Report and Written Opinion, PCT/AU2016/051115, dated Feb. 10, 2017, 12 Pages.

*Primary Examiner* — Gregory A Kessler
(74) *Attorney, Agent, or Firm* — Fenwick & West LLP

(57) ABSTRACT

Disclosed are risk visualisation methods and systems of a production environment tool. Tasks are delivered to a task board in an arrangement that indicates how long the tasks have been on the board, that is, the defined time period. For each task, a penetration value is calculated which is derived from the time elapsed since the initiation time of the task as a percentage of the defined time period. A criterion of a percentile value of the tasks establishes a subset of the tasks that have lower penetration values. Then by determining a specific task in the subset of the sequence of tasks that is at the high end of the percentile value, a visual indication of that specific task on the board provides notice to an observer of the board of whether there is a risk that the resource is falling behind in task completion.

20 Claims, 11 Drawing Sheets

SYSTEMS AND METHODS OF A PRODUCTION ENVIRONMENT TOOL

CROSS-REFERENCE TO RELATED APPLICATIONS

The present application claims priority from Australian Provisional Patent Application No 2015904794 filed on 20 Nov. 2015, the content of which is incorporated herein by reference. The present application also claims priority from Australian Standard Patent Application No 2016202811 filed on 2 May 2016, the content of which is incorporated herein by reference.

TECHNICAL FIELD

This disclosure relates to systems and methods of a production environment tool.

BACKGROUND

Production environments often rely on a number of different processes and/or tools. However, it is difficult to monitor the progress of multiple tasks to quickly ascertain the condition of each of the different processes in relation to given time requirements.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Disclosed are risk visualisation methods and systems of a production environment tool. Tasks are delivered to a task board in an arrangement that indicates how long the tasks have been on the board, that is, the defined time period. For each task, a penetration value is calculated which is derived from the time elapsed since the initiation time of the task as a percentage of the defined time period. Criterion of a percentile value of the tasks establishes a subset of the tasks that have lower penetration values. Then by determining a specific task in the subset of the sequence of tasks that is at the high end of the percentile value, a visual indication of that specific task on the board provides notice to an observer of the board of whether there is a risk that the resource is falling behind in task completion.

More specifically, disclosed is a method for displaying multiple tasks, the method determining a penetration value associated with each task based on an elapsed time from an initiation time of that task and determining a subset of tasks based on the penetration value and a time estimate associated with each of the multiple tasks in the subset. The subset of tasks can be below a line that is below referred to as a fade line. The method further includes generating a task display comprising an indication of the subset of tasks. The indication can be any type of visual indication such as shading, one task, number value etc. wherein a sum of time estimates of the tasks in the subset meets a criteria in relation to a sum of time estimates of all of the multiple tasks. The criteria can be a value such as less than 80%, but any suitable criteria such as 50% or 90% is within the scope of this discussion. The penetration value associated with each task in the subset is less than the penetration value associated with each task outside the subset where tasks below the line can be at the lower end of the ordered sequence.

In more detail, disclosed is a production environment tool, including multiple workstations configured to deliver task related output to multiple workstations and receive task related input from multiple workstation users in connection with production involving the multiple tasks and an electronic display board for displaying a display arrangement of task indicia related to the multiple tasks, the electronic display communicatively coupled to the multiple workstations and a processor for generating the display by populating the board in a column by row configuration by a) providing task indicium representative of a task having a time estimate to the board in a column for a particular resource and so that the task indicia is provided in a row representing an instance in time; and b) providing a plurality of task indicia representing tasks having time estimates to the board in the same manner as step (a) over time c) as step (b) is processed and time progresses, moving the task indicia into different rows along the same column. At a particular time, determining a penetration value associated with each task represented in the column based on an elapsed time from an initiation time of that task, the initiation time being the time when a user would have started to work on the task, determining a subset of a plurality of tasks represented in the column, the subset meeting a criteria in relation to penetration value of all of the plurality of tasks, the criteria having a high end, assessing at least one task of the subset that is at the high end of the criteria, the high end criteria representative of a risk assessment to work completion deadlines, and providing a visual indication on the board of the at least one of the task in the subset that is at the high end of the criteria so that from a pre-determined distance away from the board, the visual indication aspect of the tool providing the ability to determine the risk assessment to work completion deadlines.

Also disclosed is wherein the visual indication on the board is a colour change in the background upon which specific task data is drawn, such that the background colour upon which the data about tasks with lower penetration values is drawn is different than the background colour upon which the data about tasks with higher penetration values is drawn and wherein the visual indication on the board is a fade line. Furthermore is disclosed a method wherein tasks are delivered in a sequence to the task board in an arrangement that indicates how long the tasks have been on the board being a defined time period wherein the define time period is the associated with determining the penetration value associated with each task represented in the column based on an elapsed time from an initiation time of that task, the initiation time being the time when a user would have started to work on the task, and the defined time period, the penetration value being derived from the time elapsed since the initiation time of the task as a percentage of the defined time period. Additionally disclosed is wherein the task board includes zones indicating percentages of the defined time period and wherein the zones of the defined time period are visually distinguishable from one another. Additionally disclosed is wherein the initiation time is the time when tasks have been delivered to the work buffer of the task board via a task manager and furthermore wherein the task manager utilises x-factor input from responsible persons in time estimations.

Also disclosed is a method of a production environment tool for managing a task list including the steps of identifying a plurality of tasks in a task list, wherein each task includes a time estimate of the effort required to complete the task, the tasks delivered from a task management system, receiving a defined time period associated with the task list, receiving a percentile value, for each task in the task list, calculating a penetration value for the task, the penetration value being derived from the time elapsed since the initiation time of the task as a percentage of the defined time period, determining a specific task of the task list for which a sum of the time estimates with lower penetration values is at least the received percentile value and providing an indication of the penetration value of the specific task. Additionally, also disclosed is that the indication is a visual indication. Moreover, disclosed is wherein the tasks are delivered from the task management system to a task board in an arrangement that indicates how long the tasks have been on the board during the defined time period. Additionally disclosed is that the arrangement is columns and rows and wherein the lower penetration values are compared with higher penetration values. Also disclosed is that the initiation time is the time when tasks have been delivered to the work buffer of the task board via a task manager system and that the task management system received time estimates for the tasks via input of a responsible person of a low time estimate and an x-factor.

Additionally disclosed is a production environment tool including multiple workstations for performing multiple tasks, an electronic display board for displaying a board of the multiple tasks communicatively coupled to the multiple workstations and a processor for generating the display by populating the board by providing task indicium representative of a task having a time estimate to the board for a particular resource in an arrangement that indicates how long the task has been on the board, such being a defined time period, and so that the task indicia is provided in a position on the board representing an instance in time and providing a plurality of task indicia representing tasks having time estimates to the board in the same manner as step (a) over time. As step (b) is processed and time progresses, moving the task indicia into different positions on the board. At a particular time, determining a penetration value associated with each task represented on the board on an elapsed time from an initiation time of that task, determining a subset of a plurality of tasks represented on the board, the subset meeting a criteria in relation to penetration value of all of the plurality of tasks, the criteria having a high end, assessing at least one task of the subset that is at the high end of the criteria and providing a visual indication on the board of the at least one of the task in the subset that is at the high end of the criteria. Additionally disclosed is that the tasks are delivered from the task management system to a task board in an arrangement that indicates how long the tasks have been on the board during the defined time period. Further disclosed is that the arrangement is columns and rows. Also disclosed is that the initiation time is the time when tasks have been delivered to the work buffer of the task board via a task manager system. Moreover, disclosed is that the task management system received time estimates for the tasks via input of a responsible person of a low time estimate and an x-factor. Additionally, the visual indication on the board is a colour change in the background upon which specific task data is drawn relating to the one task of the subset at the high end of the criteria, such that the background colour upon which the data about tasks with lower penetration values is drawn is different than the background colour upon which the data about tasks with higher penetration values is drawn. Furthermore disclosed is that the visual indication on the board is a fade line.

Furthermore disclosed is a method of an electronic display board for displaying a plurality of tasks, the board including columns and rows and wherein the columns represent resources, and the rows representing time including populating the board by a) providing task indicium representative of a task having a time estimate to the board in a column for a particular resource and so that the task indicia is provided in a row representing an instance in time and b) providing a plurality of task indicia representing tasks having time estimates to the board in the same manner as step (a) over time. As step (b) is processed and time progresses, moving the task indicia into different rows along the same column. At a particular time, determining the penetration value associated with each task represented in the column based on an elapsed time from an initiation time of that task, determining a subset of a plurality of tasks represented in the column, the subset meeting a criteria in relation to penetration value of all of the plurality of tasks, the criteria having a high end, assessing at least one task of the subset that is at the high end of the criteria and providing a visual indication on the board of the at least one of the task in the subset that is at the high end of the criteria. Furthermore disclosed is that tasks are delivered in a sequence to the board in an arrangement that indicates how long the tasks have been on the board being a defined time period wherein the define time period is the associated with determining the penetration value associated with each task based on an elapsed time from an initiation time of that task, the initiation time being the time when a user would have started to work on the task, and the defined time period, the penetration value being derived from the time elapsed since the initiation time of the task as a percentage of the defined time period. Also disclosed is that the visual indication on the board is a colour change in the background upon which specific task data is drawn relating to the one task of the subset at the high end of the criteria, such that the background colour upon which the data about tasks with lower penetration values is drawn is different than the background colour upon which the data about tasks with higher penetration values is drawn. Additionally disclosed is that the visual indication on the board is a fade line.

Additionally disclosed is a method for displaying multiple tasks, including determining a penetration value associated with each task based on an elapsed time from an initiation time of that task, determining a subset of tasks based on the penetration value and a time estimate associated with each of the multiple tasks in the subset and generating a task display comprising an indication of the subset of tasks wherein a sum of time estimates of the tasks in the subset meets a criteria in relation to a sum of time estimates of all of the multiple tasks and the penetration value associated with each task in the subset is less than the penetration value associated with each task outside the subset. Also disclosed is that the criteria comprises a threshold value for a ratio of the sum of time estimates of the tasks in the subset over the sum of time estimates of all of the multiple tasks. Moreover disclosed is determining the penetration value comprises determining a percentage of the elapsed time over a display time period. Also disclosed is that tasks are delivered in a sequence to the board in an arrangement that indicates how long the tasks have been on the board being a defined time period wherein the define time period is the associated with determining the penetration value associated with each task based on an elapsed time from an initiation time of that task, the initiation time being the time when a user would have started to work on the task, and the defined time period, the penetration value being derived from the time elapsed since the initiation time of the task as a percentage of the defined time period. Additionally disclosed is that determining the subset of tasks includes determining a sorted list of the multiple tasks sorted by penetration value and determining a threshold position in the sorted list that defines the subset as tasks below the separation position. Moreover, disclosed is determining a threshold position comprises selecting out of the multiple tasks that fail the criteria the task with a minimum penetration value. Furthermore disclosed is selecting the task comprises iterating over the sorted list in ascending order and adding the time estimates to determine the sum of time estimates until the sum of time estimate fails the criteria. Also, displaying each of the multiple tasks at a location in relation to a display axis, the location indicating the penetration value of that task.

Additionally disclosed is generating the task display comprises generating a background that is indicative of the subset and wherein the background includes a gradient indicative of a limit of the subset. Also disclosed is that the indication of the subset includes a numerical value indicative of a minimum penetration value of tasks outside the subset. Furthermore, disclosed is repeating the method for multiple groups of tasks, each of the multiple groups of tasks being associated with a task performer, wherein generating the task display comprises generating multiple indications of subsets each indication being associated with one of the multiple groups of tasks.

Also disclosed is a computer system for displaying multiple tasks, the computer system including an input port to receive an indication of an initiation time and a time estimate associated with each of the multiple tasks and an output port to communicate with a display device. Also disclosed is a processor configured to determine a penetration value associated with each task based on an elapsed time from the initiation time of that task, to determine a subset of tasks based on the penetration value and the time estimate associated with each of the multiple tasks in the subset, and to generate a task display comprising an indication of the subset of tasks and to provide the task display to the display device through the output port, wherein a sum of time estimates of the tasks in the subset meets a criteria in relation to a sum of time estimates of all of the multiple tasks and the penetration value associated with each task in the subset is less than the penetration value associated with each task outside the subset. The processor of a disclosed computer system is further configured to determine a subset of a plurality of tasks the subset meeting a criteria in relation to penetration value of all of the plurality of tasks, the criteria having a high end and is further configured to assess at least one task of the subset that is at the high end of the criteria, the high end criteria representative of a risk assessment to work completion deadlines. Also it is configured to provide a visual indication on the display device of the at least one of the task in the subset that is at the high end of the criteria so that from a pre-determined distance away from the display device, the visual indication aspect of the tool providing the ability to determine the risk assessment to work completion deadlines. In the disclosed system tasks are delivered in a sequence to the display device in an arrangement that indicates how long the tasks have been on the board being a defined time period wherein the define time period is the associated with determining the penetration value associated with each task based on an elapsed time from an initiation time of that task, the initiation time being the time when a user would have started to work on the task, and the defined time period, the penetration value being derived from the time elapsed since the initiation time of the task as a percentage of the defined time period. Also disclosed is that the tasks are delivered to the display device via a task management system such defining the initiation time. Furthermore disclosed is a system wherein the visual indication on the board is a colour change in the background upon which specific task data is drawn relating to the one task of the subset at the high end of the criteria, such that the background colour upon which the data about tasks with lower penetration values is drawn is different than the background colour upon which the data about tasks with higher penetration values is drawn. Furthermore disclosed is wherein the visual indication on the board is a fade line.

Also disclosed is a method for managing a task list including identifying a plurality of tasks in a task list, wherein each task includes a time estimate of the effort required to complete the task, receiving a defined time period associated with the task list, receiving a percentile value. Also disclosed is for each task in the task list, calculating a penetration value for that task based on the time elapsed since the initiation time of that task as a percentage of the defined time period and sequencing tasks in order of respective penetration values to produce a sequenced task list and selecting a specific task of the sequenced task list for which a first sum of the time estimates of tasks with lower penetration values relative to a second sum of time estimates of all tasks is at least the received percentile value and providing an indication [visualisation] of the penetration value of the specific task.

Furthermore disclosed is wherein the time estimate of the effort required, is instead the time estimate of the effort required for only a nominated resource. Also disclosed is wherein the time estimate of the effort required, is instead the time estimate of the effort required for only a nominated resource type (such as "developer"). Additionally disclosed is wherein the time estimate of the effort required, is instead the time estimate of the effort required for only a nominated resource capability (such as "development"). Moreover disclosed is wherein the time estimate of the effort required, is instead the time estimate of the effort required for only a nominated resource skill (such as "software testing"). Furthermore disclosed is outputting the task data on a display, wherein the indication is a colour change in the background upon which the specific task data is drawn, such that the background colour upon which the data about tasks with lower penetration values is drawn is different than the background colour upon which the data about tasks with higher penetration values is drawn, for example, wherein it is the foreground colour being the colour used to draw the data which changes. Also, for example, wherein the penetration value of the specific task is drawn using a block of colour which extends from the visual representation of the zero penetration value to the visual representation of the penetration value of the specific task. Additionally disclosed is accepting a graphical image and place that image at the visual representation of the penetration value of the specific task. Moreover, disclosed is accepting a critical penetration value and change the visual representation of the name or description of the resource or resource type or capability or skill when the penetration value of the specific task exceeds that critical penetration value, the change in visual representation being a change in foreground colour and/or background colour and/or an image. Additionally disclosed is comparing the lower penetration values with higher penetration values.

Furthermore disclosed is a method for displaying multiple tasks, each of the multiple tasks being associated with a time estimate for completing that task, the method including receiving one of the multiple tasks to be displayed on a task display, appending the one of multiple tasks to a list of previously received tasks, determining a position in the list where a sum of time estimates of tasks appended after that position meets a criteria in relation to a sum of time estimates of all tasks in the list and generating a task display comprising an indication of an elapsed time of the task at the determined position. Additionally disclosed is wherein the indication of the elapsed time is an indication of a percentage of the elapsed time of a predetermined time period and wherein the criteria is a criteria in relation to penetration value of all of the plurality of tasks, the criteria having a high end, assessing at least one task of the subset that is at the high end of the criteria, the high end criteria representative of a risk assessment to work completion deadlines and providing a visual indication on the board of the at least one of the task in the subset that is at the high end of the criteria so that from a pre-determined distance away from the board, the visual indication aspect of the tool providing the ability to determine the risk assessment to work completion deadlines. Furthermore disclosed is wherein the visual indication is a fade line.

Optional features described of any aspect of method, computer readable medium or computer system, where appropriate, similarly apply to the other aspects also described here.

BRIEF DESCRIPTION OF DRAWINGS

An example will be described with reference to

FIG. 3a illustrates a task board as generated by processor of the display managing server in FIG. 3a.

FIG. 5 illustrates an example using a gradient in the task board of FIG. 3a.

DESCRIPTION OF EMBODIMENTS

Disclosed are methods and systems of a production environment tool that can provide a visual indication of the risk that a resource will not complete one or more assigned tasks within a defined time period. Tasks are delivered in a sequence to one or more task boards in an arrangement that indicates how long the tasks have been on the board, that is, the defined time period. The initiation time of the task is the time the task is moved to and/or appears on the board by action of a task manager and therefore work on the task has commenced. For each task of the resource, a penetration value is calculated. The penetration value is derived from the time elapsed since the initiation time of the task as a percentage of the defined time period. A criteria of a percentile value of the tasks in the sequence of tasks establishes a subset of the sequence of tasks that have lower penetration values. Then by determining a specific task in the subset of the sequence of tasks that is at the high end of the percentile value, an indication of that specific task on the board can be provided. A visual indication of that specific task on the board provides notice to an observer of the board of whether there is a risk that the resource is falling behind in task completion.

Figure 1:
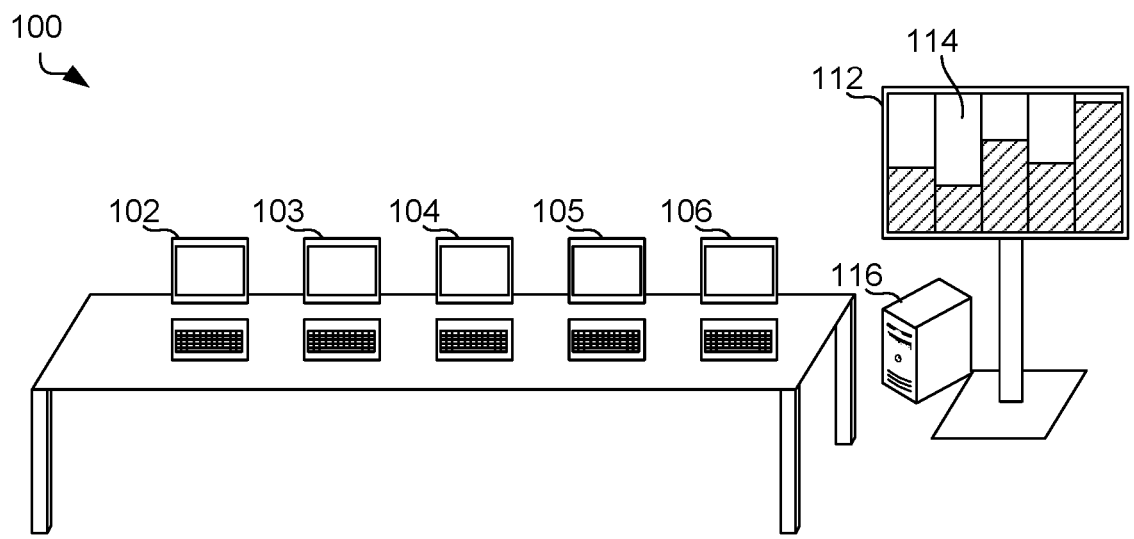
FIG. 1 illustrates a production environment.

FIG. 1 illustrates a production environment 100, such as an open plan office where, for example, a new software application is coded. The production environment 100 is any production environment, for example, it may also be related to manufacturing goods, such as cars, or a call centre processing customer calls, a warehouse receiving and distributing goods, or any other production environment.

The production environment 100 comprises as an example five workstations 102-106 for performing multiple tasks. In some examples a task is a part of the entire product, such as a coding a function or class of a software product, the translation of a particular user interface into a different human language, testing of a software module and other tasks. In these examples, the work stations 102-106 are computer clients, such as Personal Computers. A task manager (an example discussed below) estimates how long it will take or is estimated to take to complete each task from when the task is commenced and assigns each task to one of the work stations 102-106. Each workstation may be associated with one operator, such as a programmer, such that the task manager associates each task with that programmer, a group of resources or any other combination of entities involved with the task. The task manager may include an time estimate tool utilising an x-factor to determine time estimates. The x-factor is discussed in detail below.

Production environment 100 includes the tool that further includes an electronic display 112 for displaying a board 114 of the multiple tasks. In one example, the display 112 is a TV screen. The display 112 is communicatively coupled to the multiple workstations 102-106. For example, an HDMI cable or Wi-Fi connects the display 112 to a display managing server 116, which is, in turn, connected to the same network that the workstations 102-106 are connected to. This way, the display 112 is communicatively coupled to the workstations 102-106. In one example, the task manager is a further server on the same network and sends task assignment data to the display managing server 116. The task assignment data is indicative of the assignment of each task to one of the workstations 102-106 or operators.

While some examples relate to the task board 114 being displayed on display 112 it is to be noted that task board 114 may equally be displayed on the workstations 102-106 or on any other computer system or printed. Task board 114 may be accessible as a HTML webpage or other graphics page by using a web browser. It is beneficial that the task board 114 is a large board that can be seen from a distance, as the visualisation feature that is described herein provides to the viewer notice of a potential risk of a resource falling behind in task completion substantially without need for detailed analysis.

As will be explained in more detail below, the displayed indication on the board relates to the sum of time estimates of the tasks of lower penetration value in relation to all tasks. This allows an observer of the board such as a supervisor or a resource to assess the predictability of the tasks pipeline on the board because in cases where the bulk of the work has a low penetration value, that is, the bulk of the work is very young, variations to the process, such as sick days, affect the completion within the desired time frame less than in cases where the bulk of the tasks has a high penetration value. This is an advantage over other methods that simply display the total of estimated hours and therefore, do not allow ready or effective assessment.

Figure 2:
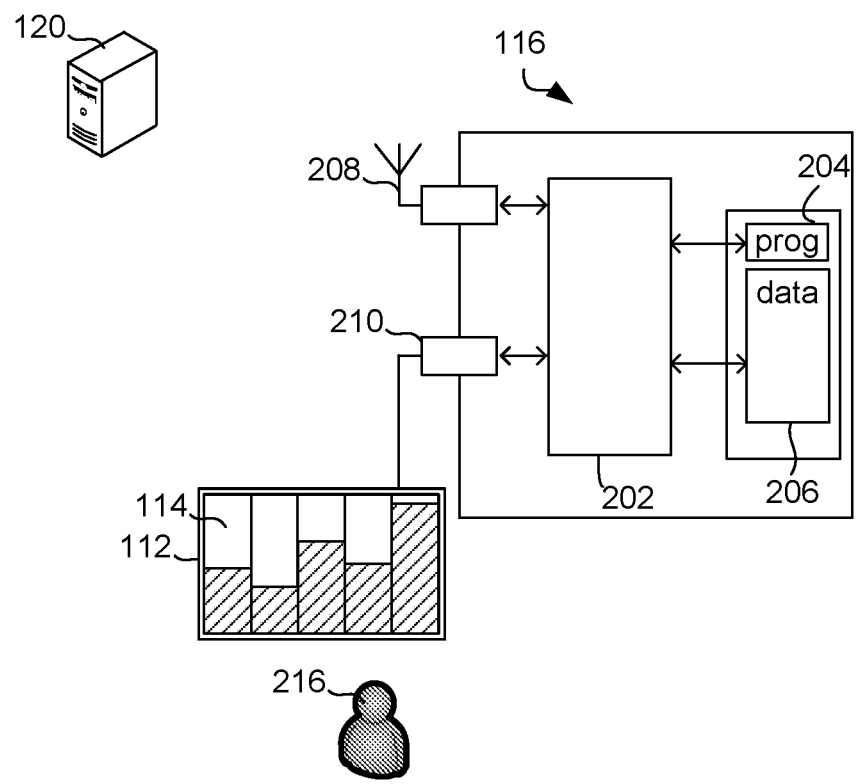
FIG. 2 illustrates a display managing server.

FIG. 2 illustrates the display managing server 114 in more detail. Display managing server 114 comprises a processor 202 connected to a program memory 204, a data memory 206, a communication port 208 and a user port 210. The program memory 204 is a non-transitory computer readable medium, such as a hard drive, a solid state disk or CD-ROM. Software, that is, an executable program stored on program memory 204 causes the processor 202 to perform the method in FIG. 4, that is, processor 202 determines for each task a penetration value, determines a subset of tasks based on the penetration values and creates a visual indication of the subset, such as by displaying a bound of the subset.

While the detailed description of the task board 114 on screen 112 is provided further below, it is noted that each column of the display relates to one of the workstations 102-106 and the shaded areas shown in FIGS. 1 and 2 indicate tasks that are within the subset. In this example, a shaded area that is too tall can indicate a risk that completion deadlines may not be met. Other factors may be present, as in this example, the layout of the tasks and time is in column and rows, where columns indicate the resources, and rows indicate the times. Any layout providing resources and the defined time is within the scope of this discussion. Any observer or supervisor 216 can look at the display 112, preferably from a distance, can determine immediately whether any workstations present potential risk of a resource falling behind in task completion. If all shaded areas extend to about the middle of the board 114, it is possible to presume that the production environment 100 is operating at its optimum.

In this example, this particular use of shaded areas considers the advantage of psycho-optical conditioning of most humans, which means that surface properties and in particular, changes in surface properties are readily recognised. For example, the human brain is highly optimised to interpret visual stimulation such that coherent surfaces are identified in order to distinguish objects from each other and from the background. This capability is used in the task display board 114 by displaying the most important measure of the task processing as a transition between areas with different coherent properties, such as colours, brightness values or shading.

The processor 202 may store the task board 114 on data store 206, such as on RAM or a processor register in the form of a bitmap image, pixel values in a framebuffer or an graphics card buffer. Creating, generating, modifying the board including related actions, may relate to the processor 202 generating a coded representation, such as an HTML table or an SVG file, that is accessible by display 112 through an internet browser in kiosk mode, for example. Processor 202 may also send the task board or other data, such as the penetration value via communication port 208 to a server, such as the task manager.

The processor 202 may receive data, such as task data, from data memory 206 as well as from the communications port 208 and the user port 210, which is connected to display 112 that shows a visual representation 214 of the board to the supervisor 216. In one example, the processor 202 receives task data from the task manager via communications port 208, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 202 receives and processes the task data in real time. This means that the processor 202 can update the board 114 when task data is received from the task manager and completes this calculation before the task manager sends the next task data update, such as data indicating the completion of a task or the assignment of a new task.

Although communications port 208 and user port 210 are shown as distinct entities, it is to be understood that any kind of data port may be used to receive data, such as a network connection, a memory interface, a pin of the chip package of processor 202, or logical ports, such as IP sockets or parameters of functions stored on program memory 204 and executed by processor 202. These parameters may be stored on data memory 206 and may be handled by-value or by-reference, that is, as a pointer, in the source code.

The processor 202 may receive data through all these interfaces, which includes memory access of volatile memory, such as cache or RAM, or non-volatile memory, such as an optical disk drive, hard disk drive, storage server or cloud storage. The computer system 200 may further be implemented within a cloud computing environment, such as a managed group of interconnected servers hosting a dynamic number of virtual machines.

It is to be understood that any receiving step may be preceded by the processor 202 determining or computing the data that is later received. For example, the processor 202 determines the penetration value and stores the penetration value in data memory 206, such as RAM or a processor register. The processor 202 then requests the value from the data memory 206, such as by providing a read signal together with a memory address. The data memory 206 provides the data as a voltage signal on a physical bit line and the processor 202 receives the penetration value via a memory interface.

It is to be understood that throughout this disclosure unless stated otherwise, nodes, edges, graphs, solutions, variables, values and the like refer to data structures, which are physically stored on data memory 206 or processed by processor 202. Further, for the sake of brevity when reference is made to particular variable names, such as "period of time" this is to be understood to refer to values of variables stored as physical data in computer system 200.

Figure 3A:
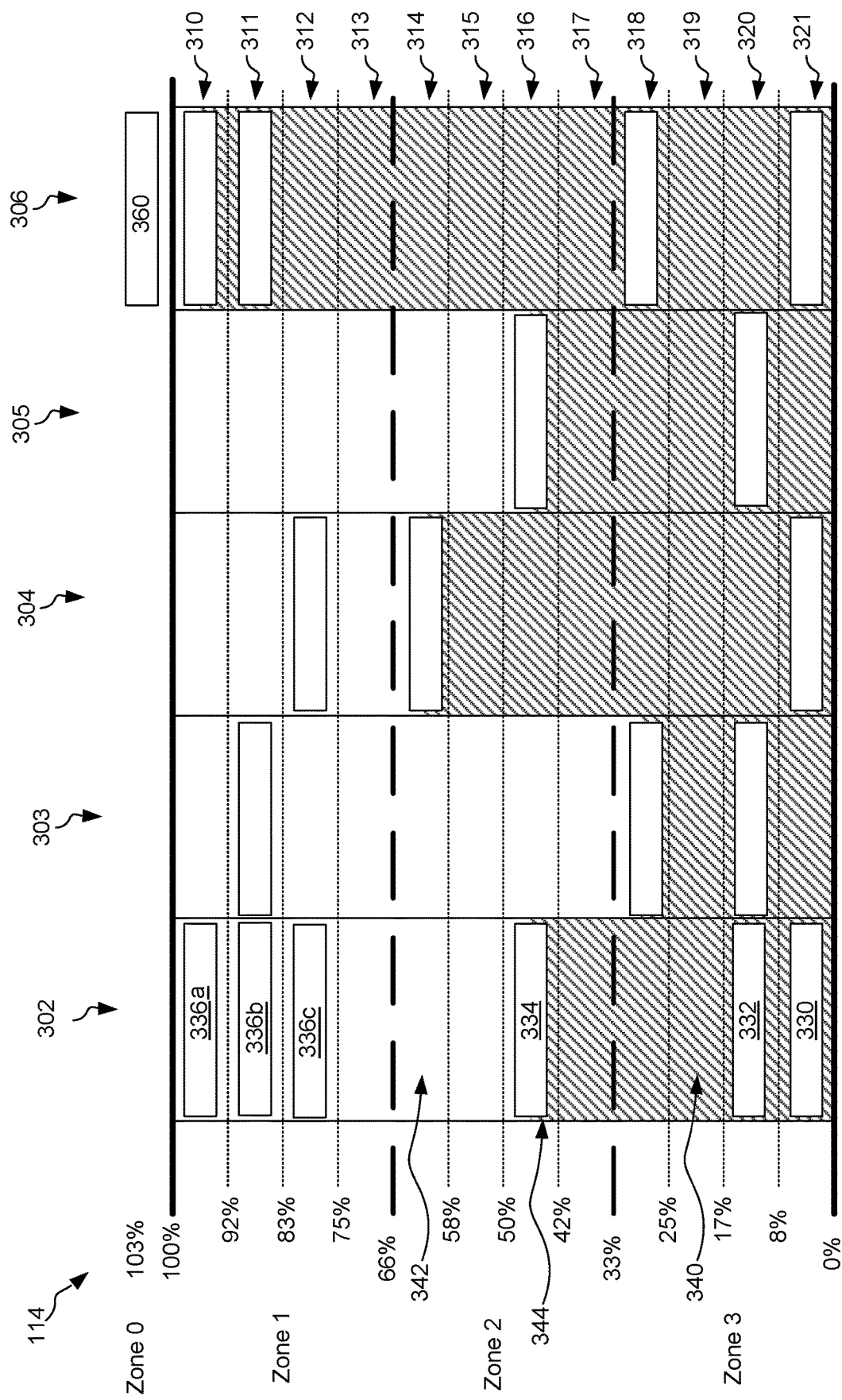

FIG. 3a illustrates board 114 as generated by processor 202 in more detail. In the example, board 114 can include, for example, five columns 302-306, each being, for example, associated with one workstation. A column may refer to a resource team rather than an individual, or in an example other than software development, any other suitable characterisation. For example, column 302 is associated with workstation 102, column 303 with workstation 103 and so on. Board 114 further comprises twelve rows 310-321. The columns represent resources, such as workstations or programmers and the rows represent time. As mentioned previously, the task board can be in any arrangement that indicates how long the tasks have been on the board. In one example, the entire vertical extension represents 12 days and each row represents one day although other partitions are equally possible.

Figure 4:
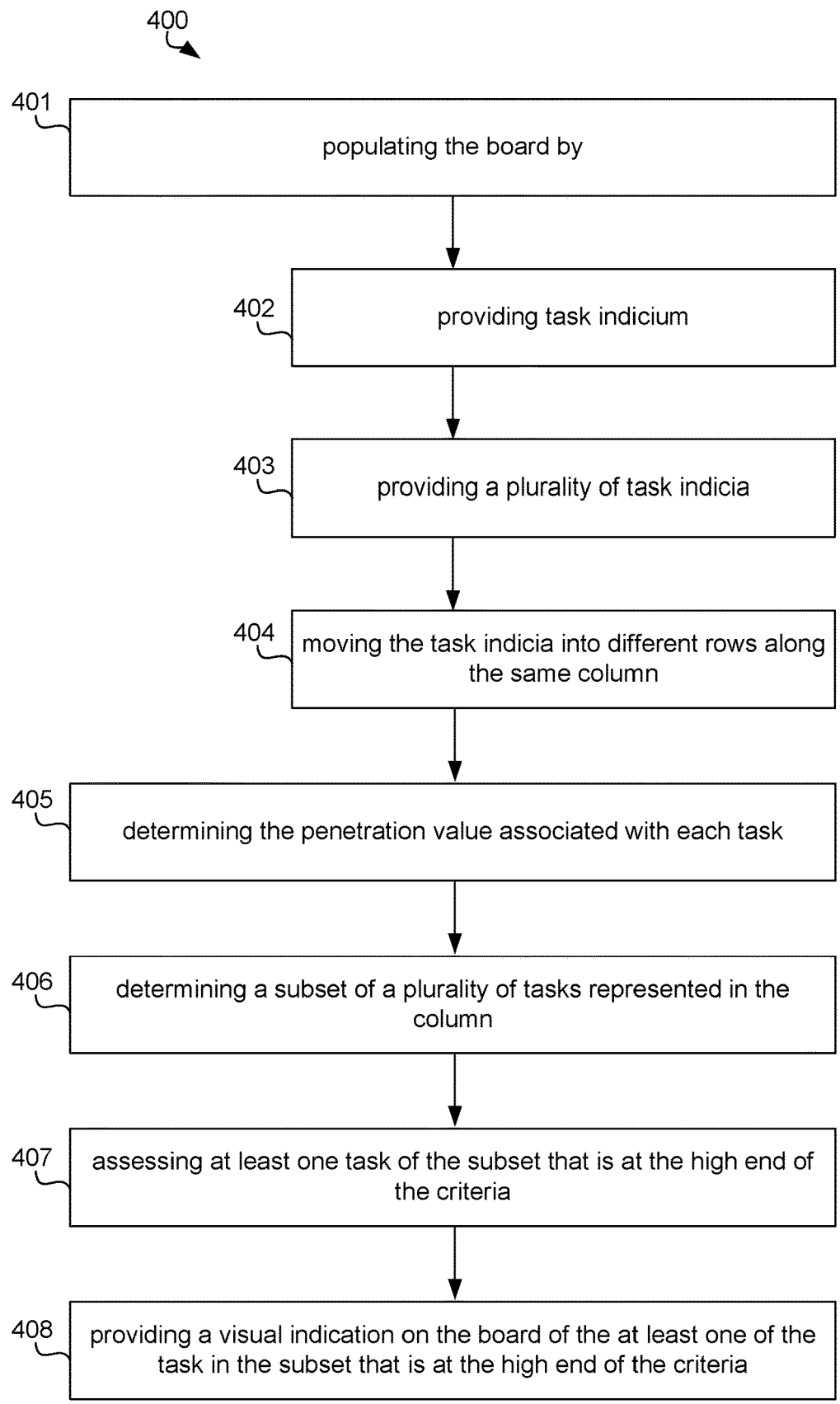
FIG. 4 illustrates a method for displaying a plurality of task.

FIG. 4 illustrates a method 400 as performed by processor 202 for displaying the plurality of task. Method 400 commences by populating 401 the board with tasks, typically via a task manager. Processor 202 populates 401 the board by providing 402 a task indicia representative of a task having a time estimate to the board in a column for a particular resource and so that the task indicia is provided in a row representing an instance in time.

Again, referring to the example of FIG. 3a four tasks are assigned to workstation 102 and each task has a time estimate for the time it will take to complete that task from when the task is initiated. A task initiation time is taken to mean when the task is released to the task display board and/or displayed. For the first of those tasks, processor 202 generates a task indicium 330 in the form of a rectangular shape, for example. Any suitable shape is within the scope of this discussion. Processor 202 provides the task indicium 330 to the board 114 in column 302 for workstation 102. The vertical position, that is, the row in which processor 202 provides the task indicia represents an instance in time. In this example, processor 202 provides task indicia 330 in row 321, which indicates day one since the task has been initiated.

Processor 202 further populates the board by providing 403 a plurality of task indicia representing tasks having time estimates to the board in the same manner as step 402 over time. For example, processor 202 can provide more tasks indicia at the same position as task indicia 330.

It is noted that for simplicity of presentation the numerals used for indicia in FIG. 3a are also used for the tasks themselves in the following description to indicated that there can be a direct one-to-one relationship between one task and one indicia.

As step 403 is processed and time progresses, processor 202 further populates the board by moving the task indicia into different rows along the same column. In the example of FIG. 3a, processor 202 provided a second task indicia 332 to the board yesterday and since time has progressed to the next day, processor 202 has moved task indicia 332 one row up and into row 320. This indicates that this is the second day that workstation 302 processes the second task. Similarly, third task indicia 334 indicates that this is the sixth day the third task is processed and fourth task indicia 336 indicates that this is the 12$^{th}$ day that the fourth task is processed. In other words, in this example, every day processor 202 moves all tasks up by one row. In a different board configuration, the task movement can be any suitable direction, for example, across the board, down the board, or in a circular patterns. The board configuration described here is an example. It is understood that tasks are delivered to the board in any arrangement that indicates how long the tasks have been on the board, that is, the defined time period.

When a task is completed it can be so indicated by a user of a work station. In the case of automation, and instruction for completion can be automated. In that case the processor 202 removes the corresponding task indicia from the board 114. This means that tasks do not need to move all the way to the top but more likely are completed and removed before they arrive there. For example, a task that is completed within the first day appears only in row 321 and then disappears.

At a particular time, processor 202 determines 405 a penetration value associated with each task represented in the column based on an elapsed time from an initiation time of that task. In the example of FIG. 3a, the penetration value is a percentage of the total time, that is, a percentage of 12 days. Particularly, the first task represented by first task indicia 330 was started today, so the elapsed time is 0 days. The penetration value $V_p$ is calculated as $$V_p = \frac{t_{now} - t_{start}}{t_{total}} \qquad (1)$$

where $t_{now}$ is the current time in days, $t_{start}$ is the starting time in days and $t_{total}$ is the total number of days, that is, 12 days in this example.

Accordingly, the penetration value for the first task 330 is 0/12=0%, for the second task 332 is 1/12=8%, for the third task 334 is 5/12=42% and for the fourth task 336 is 11/12=92%, which is also indicated in FIG. 3a by the line directly below task indicia 330, 332, 334 and 336, respectively. These penetration values are later used to sort the tasks by penetration value as will be explained with reference to FIG. 3b.

In the next step of method 400, processor 202 determines 406 a subset of a plurality of tasks represented in the column. The subset may be defined by a requirement on the subset such that the subset contains the tasks that together satisfy the requirement. This requirement is also referred to as criteria to indicated that the criteria effectively selects tasks that meet the criteria. More particularly, the criteria is defined in relation to the penetration value of all of the plurality of tasks and may be defined in relation to the estimated time for each task. For example, the criteria may be that all tasks of minimum penetration value are selected such that the sum of estimated times of the selected tasks is less than a threshold, such as 80% of the total time of all tasks together. This way, the criteria has a low end of 0% and a high end of 80%, for example.

The threshold may have other values, such as any value above 50% or any value between 70% and 90%. As is mentioned below, the threshold may be selected depending upon the use of the disclosed production environment tool. Different uses of the disclosed systems and methods are within the scope of this discussion.

In one example, processor 202 determines the subset by iteratively including tasks into the subset and computing a sum of time estimates of tasks in ascending order of penetration value. At each iteration, that is, each time processor 202 computes the sum, processor 202 compares the current value of the sum against the threshold. If the current value of the sum is greater than the threshold, processor 202 can terminate the iteration and store an indication of the subset on data store 206. Since the subset contains all tasks with a lower penetration value than the last included task, the indication of the subset may be an indication of the last included task. In other words, the subset may be uniquely defined by an identifier of or reference to the last included task.

Iterating over the tasks in ascending order of their penetration value may be facilitated by processor 202 sorting the tasks by penetration value and storing the sorted list on data memory 204, such as by declaring a list or array variable that holds the sorted tasks in a sequential order. For example, the tasks in the sorted list can be accessed in ascending order by incrementing a list index and accessing the task at the current index position:

i=0, sum=0;
while sum<threshold:
sum+=sorted_list[i];
i++;
end while

Referring back to the example of FIG. 3a, the four tasks may have estimated times as set out in the table below. The table also includes penetration values from above and cumulative estimated times and percentages as will be explained below.

| Task | Estimated time | Penetration | Cumulative time | Cumulative percent |
|---|---|---|---|---|
| first task 330 | 5 hours | 0% | 5 hours | 28% |
| second task 332: | 3 hours | 8% | 8 hours | 45% |
| third task 334: | 7 hours | 43% | 15 hours | 83% |
| fourth task 336: | 3 hours | 92% | stopped | stopped |

Figure 3B:
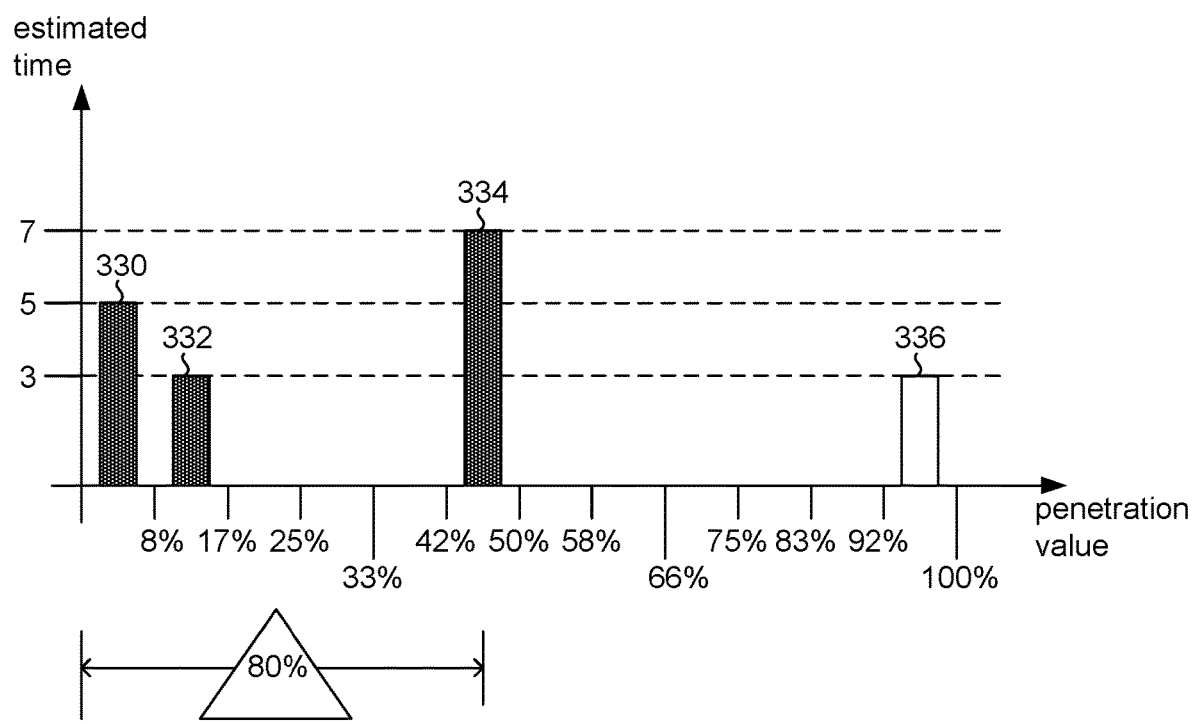
FIG. 3b illustrates an example set of tasks graphically, where the height of the boxes indicate the estimated time of each task.

FIG. 3b illustrates this example graphically, where the height of the boxes indicate the estimated time of each task. Processor 202 sorts the list of tasks by penetration value in order to obtain a sorted list. In FIG. 3b this relates to a positioning of each task along the horizontal axis of the penetration value and starting from the very left and continuing towards the right, that is, in direction of ascending penetration value. The table above is already sorted.

The total of all time estimates is 18 hours. The 80% threshold is then 14.4 hours. Processor starts with the tasks having the lowest penetration value, which is the first task 330. The sum of estimated times of the subset contains only the estimated time of the first task 330 and is, therefore, 5 hours. Since 5 hours is less than the threshold of 14.4 hours, processor 202 continues and adds the second task 332. In other words, 5 hours is 28% of 18 hours, which is less than 80%. The result for the sum is 8 hours (45% of 18 hours), which is still less than 14.4 hours (less than 80%). Therefore, processor 202 also adds third task 334, which increases the sum to 15 hours (83% of 18 hours). This is now greater than the threshold and therefore, processor 202 stops. As a result, the subset contains the first task 330, second task 332 and third task 334 but not fourth task 336 (336a, 336b, and 336c collectively) as indicated by the darker fill of the respective boxes in FIG. 3b. The last included task is the third task 334 and processor 202 stores an indication of the third task 334 on data memory 202. For example, processor 202 sets a flag that is associated with the third task 334 or stores an identifier of the third task 334, which defines the subset of tasks having a penetration value of less or equal than the third task 334.

Processor 202 then assesses 407 the third task 334, which is the task of the subset that is at the high end of the criteria, that is, the task that caused the sum to exceed the threshold. Assessing the third task 334 comprises retrieving the penetration value of the third task 334 or the vertical position of the third task indicia 334 on the board 114.

Finally, processor 202 provides a visual indication on the board of the third task 334, that is, the task in the subset that is at the high end of the criteria. This visual indication may be a line or, as shown in FIG. 3a, a change in background colour. Processor 202 renders the area below third task indicia 334, which extends from 0% to 42% and is generally indicated at 340, as having a darker background colour than the area above third task indicia 334, which extends from 50% to 100% and is generally indicated at 342.

Third task 334 is located in a cell 344, which lies between the lower area 340 and the upper area 342. Therefore, the transition between the darker area 340 and the lighter area 342 occurs within this cell 344. In one example, the vertical position may not be relevant. In other words, the board 114 is discretised to the number of different rows, which occurs if processor 202 moves tasks upwardly by full days instead of fraction of days. This applies to the example where the total time is 12 days and there are 12 rows. In other examples, processor 202 moves tasks by whatever time each row represents, that is, the total time divided by the number of rows.

In such cases of discretisation, the change between upper area 342 and lower area 340 may occur at the 50% line above third task indicia 334 or at the 42% line below third task indicia 334. In one example, processor 202 renders a colour gradient or intensity gradient extending across cell 344. The intensity gradient is herein referred to as a "fade line".

FIG. 3a shows the lines 33% and 66% which separate Zones 1, 2 and 3 from each other. These demarcations are configurable of course, however, for the purpose of illustration of the tool in use, it is useful to consider these Zones. In the column 302, there are tasks 330 and 332 in Zone 3 which would be most recently introduced to the board. Then there is task 334 in Zone 2 which represents around 50% of the 12 day time period. Then there are tasks 336a, 336b and 336c (together being task 336 as per the previous discussion) in Zone 1 which would indicate that these tasks have been in the 12 day time period buffer closer to 12 days. Were an observer such as a supervisor to look at column 302, they would see that the fade line is in Zone 1 below the 50% line which is actually considered in this example to be a safe place for the 80% criteria to rest, that is, where there is acceptable risk. It may be alarming to an observer that tasks 336a, 336b and 336c are in Zone 1 where they are quite close to the 12-day time period, the defined time period in this example, were it not for the fact that the fade line is behind task 334 well within Zone 2. If the fade line were closer to the 66% line, with the tasks 336a, 336b and 336c in Zone 1, the risk of tasks not being completed would be higher than where it is, below the 50% line. Therefore, it is also possible that the position of the visual indication, in this example, a fade line with respect to incomplete tasks above it can be an indicator of risk as well as the fade line itself.

Of note is column 306 where the fade line is at the top of the column in Zone 1 behind the task at row 310. Moreover, there is a task 360 in Zone 0 which is at 103% of the time period of 12 days, that is due past the defined time period, that is in this example, the 12 day buffer range. An observer may see that this is a real problem. There may be a good reason why this column shows the fade line at the top of Zone 1, for example, the resource (developer) may be ill. Reallocation of the tasks may be in order. Again, all of these zones, visual indications and criteria are configurable. Zones are not necessary but can better illustrate the position of the fade lines.

In choosing the configurable criteria, in this example 80%, factors can be taken into account. In the present example, the production environment is software development. Cushions providing flexibility in time estimates have been provided. See the discussion below relating to time estimates. However, in a business such as a warehouse at a port, for example, where any time that an item sits in that warehouse, there is a cost charged, there may be a need to set the criteria to 100% to avoid extra costs. That is, items must be moved out of the warehouse within the time period, which could be set to one day, where 100% completion is required to avoid extreme expense. The circumstances of the use of the tool provide the configuration of the time periods, the zoning, the criteria and any other variation, including the indication method.

Figure 5:
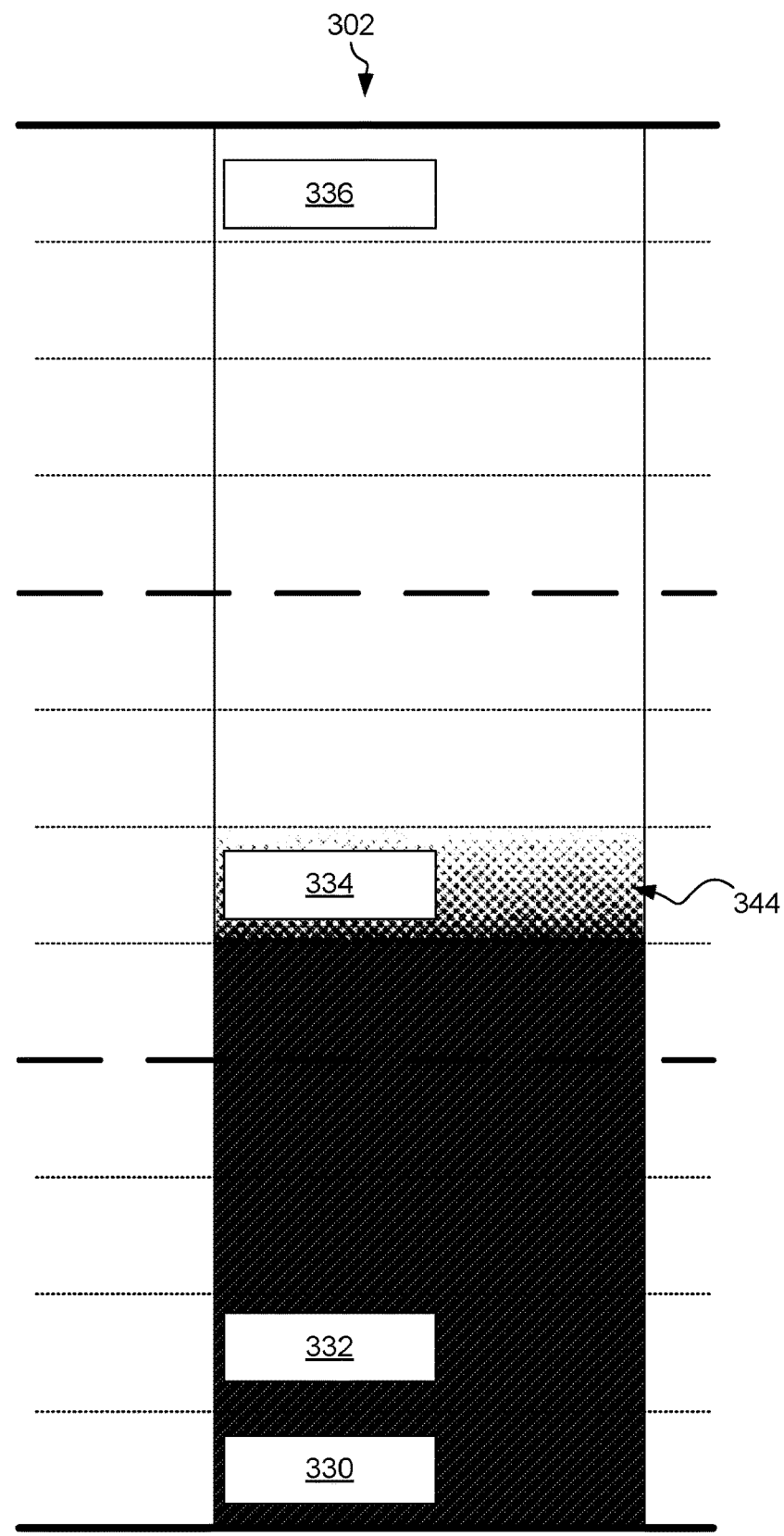

FIG. 5 illustrates the gradient example in more detail where the task indicia 330, 332, 334 and 336 are reduced in size to make the gradient (the "fade line") in cell 344 more clearly visible. As is mentioned elsewhere, the graphical representation is any suitable representation to provide noticed of risk.

FIG. 4 is to be understood as a blueprint for the software program and may be implemented step-by-step, such that each step in FIG. 4 is represented by a function in a programming language, such as C++ or Java. The resulting source code is then compiled and stored as computer executable instructions on program memory 204. This also applies to other method described herein. The use of a computer is inextricably linked as integral to the disclosed systems and methods. The assessment of the risk that a resource will not complete tasks within a defined period requires movement of tasks to the board via a task manager, processing of time estimate elements of the tasks in several ways and a graphical interpretation of criteria established by configuration so that output provides an observer with a current and timely risk assessment at a glance. The real-time availability of risk assessments requires real-time, fast, and precise computational ability as well as real-time graphical output.

Figure 6:
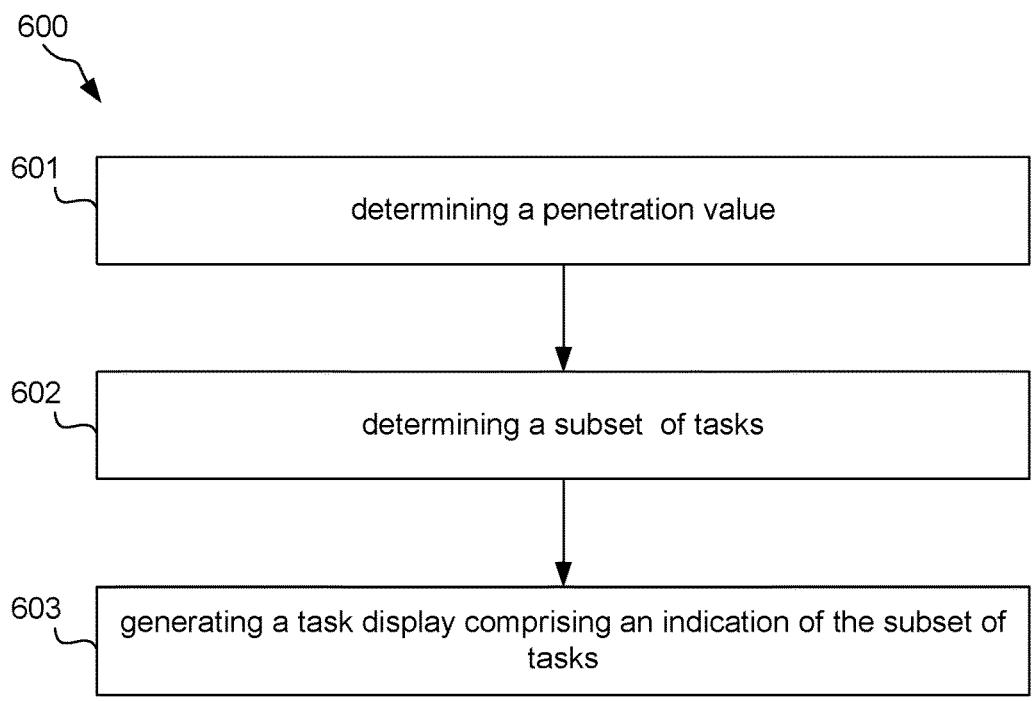
FIG. 6 illustrates another example method for displaying multiple tasks.

FIG. 6 illustrates another example method 600 performed by processor 202 for displaying multiple tasks. Again, processor 202 determines 601 a penetration value associated with each task based on an elapsed time from an initiation time of that task as described above. Tasks are typically delivered in sequence via a task manager. Then, processor 202 determines 602 a subset of tasks based on the penetration value and the time estimate associated with each of the multiple tasks in the subset as also described above. As shown in FIGS. 3 and 5, processor 202 generates a task display 114 comprising an indication of the subset of tasks, such as by generating a graphical indication of the one task 334 that defines the upper limit of the subset.

The sum of time estimates of the tasks in the subset meet a criteria in relation to a sum of time estimates of all of the multiple tasks, such as a ratio of the sum of time estimates to the sum of time estimates of all tasks is below a threshold, such as 80%. Further, the penetration value associated with each of the tasks 330, 332 and 334 in the subset is less than the penetration value associated with task 336 (collectively 336a, 336b, and 336c) outside the subset.

It is noted that processor 202 may receive various configuration parameters from supervisor 216, such as through a user interface where the supervisor 216 can enter configuration data. Time intervals for updating the risk assessment can be configured. Where processing is at a premium, it may be beneficial to provide the risk assessment at a task initiation time. Alternatively, as tasks are deleted from the board, the risk assessments may be more appropriate. Of course, risk assessment can be periodic or at any other suitable time, including continuous or continually.

Figure 7:
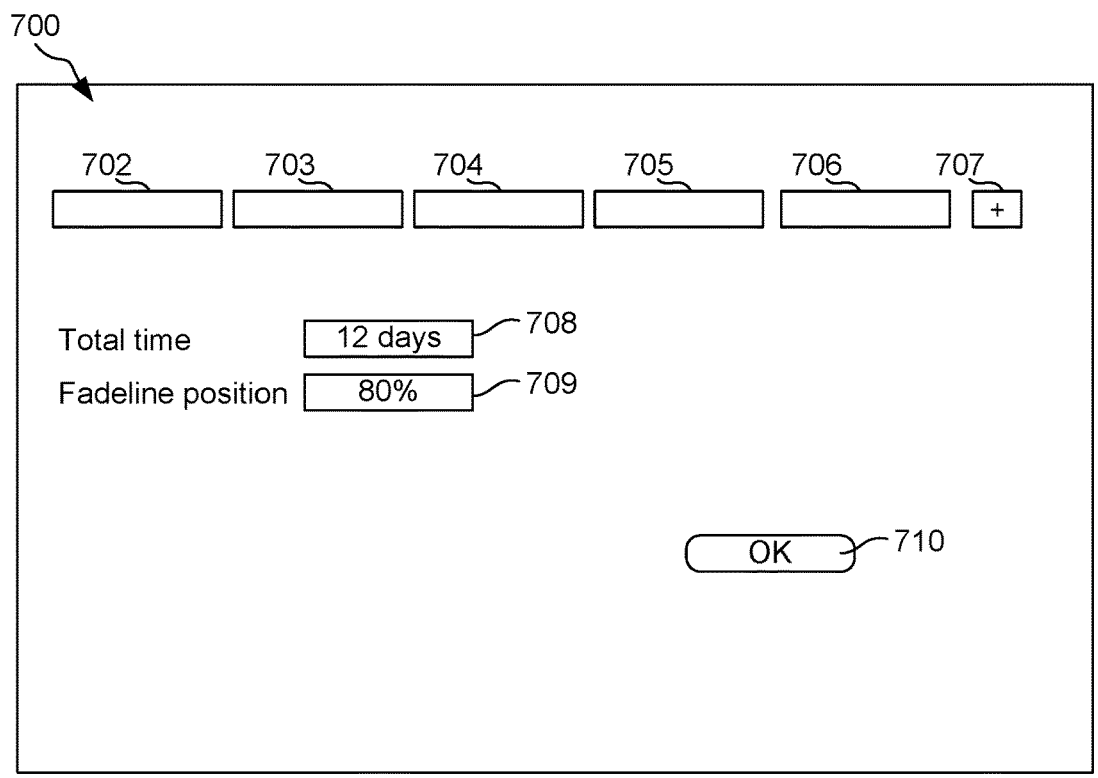
FIG. 7 illustrates a configuration user interface.

FIG. 7 illustrates a configuration user interface 700 comprising five text input fields 702-706 to provide a name for each of the five resources 102-106 in FIG. 1 to appear on top of each of the five columns 302-306 in FIG. 3a. Interface 700 further comprises a control element 707 to add further columns for further resources. Interface 700 also comprises a time input field 708 to configure the total time of the task board 144, which is 12 days in the examples above and a percentage input field 709 to enter the condition for defining the subset, which directly influences the location of indication of the subset, that is, the cell where the fade line is located. As mentioned, a fade line is where there is a colour gradient from lighter to darker, from darker to lighter, from one colour to another, or any other manner in depicting a change in the background such as in FIG. 5, item 344. Of course, the one task of the subset that is at the end of the criteria can be represented in any way, including a change in a pattern, a completely different visual effect such as a flashing or pulsing item on the board. Other media, such as an alarm, can be used individually or combined to provide the effect so that feature that is described herein provides to a manager or other concerned entity notice of a potential risk of a resource falling behind in task completion in accordance with the described methods and systems.

The indication can further be described as where the task data is output on a display and the indication is a colour change in the background upon which the specific task data is drawn, such that the background colour upon which the data about tasks with lower penetration values is drawn is different than the background colour upon which the data about tasks with higher penetration values is drawn. The lower penetration values can be compared with higher penetration values.

It is within the scope of this discussion to provide that the one task that is at the high end of the criteria can be indicated in any manner. For example, the foreground colour is the colour used to draw the data which changes. Furthermore, where the penetration value of the specific task is drawn using a block of colour which extends from the visual representation of the zero penetration value to the visual representation of the penetration value of the specific task. Also, where the tool is configured to accept a graphical image and place that image at the visual representation of the penetration value of the specific task. Additionally, where the tool is configured to accept a critical penetration value and change the visual representation of the name or description of the resource or resource. Also, the type or capability or skill when the penetration value of the specific task exceeds that critical penetration value, the change in visual representation being a change in foreground colour and/or background colour and/or an image, which can be inside or outside the area of the board indicating a particular resource.

Finally, interface 700 comprises a submit control 710. Processor 202 monitors user interaction with respect to the submit control 710. Upon detecting user interaction with respect to the submit control, processor 202 requests and receives the entered configuration parameters. In particular, processor 202 receives the time period 708 and the percentage 709 as entered into the interface 700.

The task board 114 in FIG. 3a includes three sections defined by the 33% line and the 66% line. Processor 202 may render each section or other configured sections (or none at all) in a different background colour and the upper area 342 and lower area 340 are distinguished by a brightness value instead of a colour value. In this case the transition in cell 344 is a brightness gradient that maintains the colour value constant. For example, the background colour may be stored on data store 206 in a Hue-Saturation-Lightness (HSL) colour space. This leads to the advantage that processor 202 only needs to use a linear gradient on the lightness value while keeping the hue and saturation values constant.

Task board 114 may further include headings above each column representing the name of the resource, such as the programmer working at the respective workstation. The heading may include colour information indicative of the section in which the indication of the subset, that is task 334, is located. For example, the section between 0% and 33% (Zone 3) can have a blue background, the section between 33% and 66% (Zone 2) can have a yellow background and the section between 66% and 100% (Zone 1) can have a red background. As mentioned above, these sections can also be referred to as zones and are configurable to further assist in assessing risk.

The other columns 303-306 also contain task indicia as described above but with different penetration values and estimated times. Accordingly, the subset is indicated by the extent of the shaded area in each column. As a result, the board may include two shades of each of the three colours mentioned in the example above, providing an indication of the task at the high end of the criteria by colour intensity.

The different background colours of the zones can provide a further indication of the subset, that is, a further indication of the task that causes the sum of time estimates exceed the threshold. It can be convenient for the observer, such as supervisor 216 to simply look at the background colour of the zones and where the one task of the subset that is at the high end of the criteria (such as being indicated by, for example, a fade line) falls to ascertain the status of all the workstations 102-106 immediately. Supervisor 216 can immediately see that workstation 303 needs attention because of the position of the fade line with respect to workstation 103 fade line. For example, it could mean not enough tasks are assigned to workstation 103. In contrast, workstation 106 needs attention because the position of the fade line of workstation 106. This can mean that there is a high risk that tasks on the buffer board will not be performed within the 12-day time period, which indicates a low predictability of the completion time of tasks with workstation 106. This introduces unknown variability into the production process, which is undesirable. Therefore, supervisor 216 will contact workstation 106 in order to address these issues to bring workstation 106 fade line to a desirable position in the defined time period.

Figure 8:
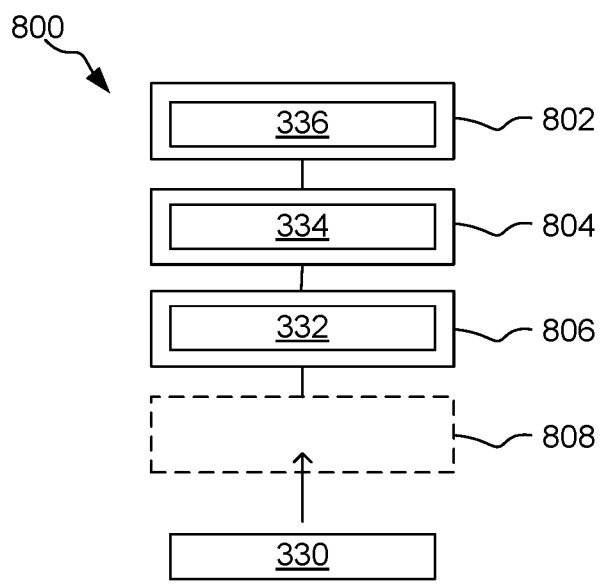
FIG. 8 illustrates a list of tasks.
Figure 9:
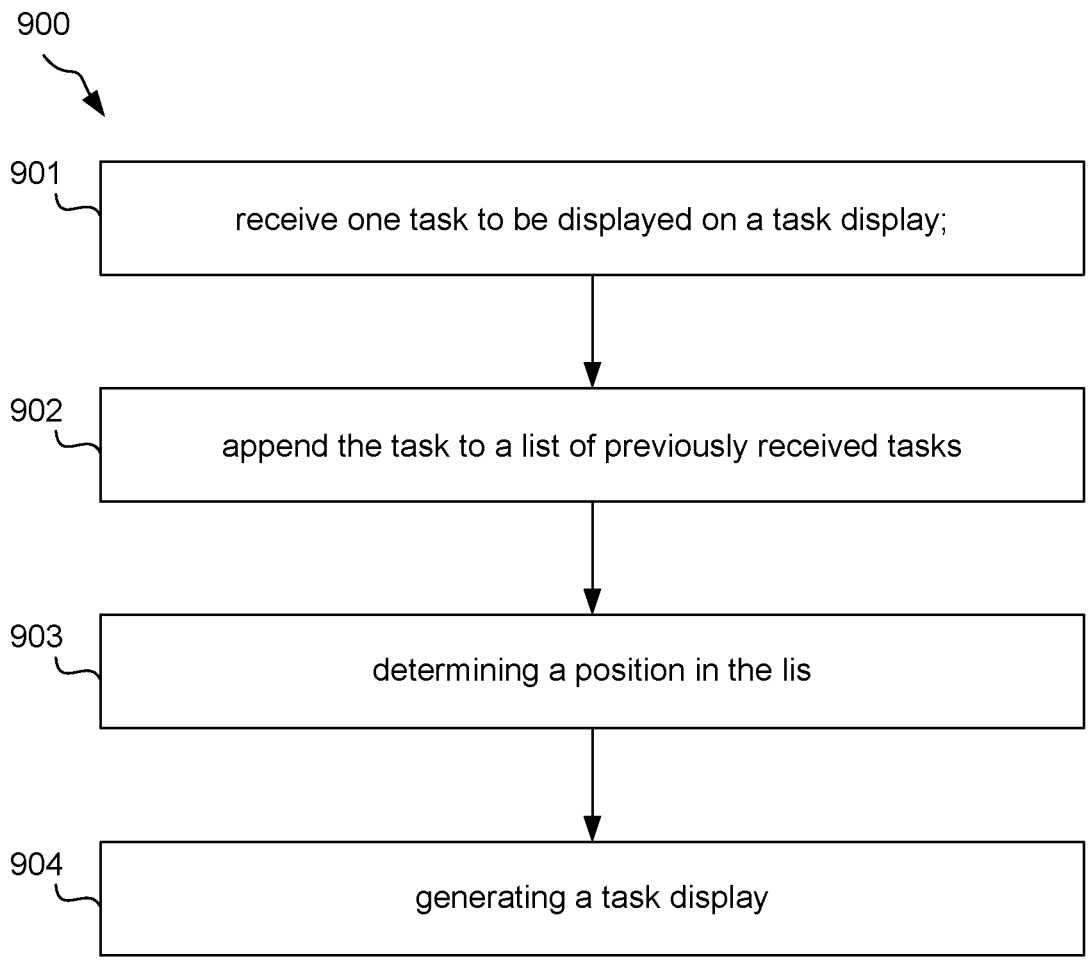
FIG. 9 illustrates a further method for displaying multiple tasks.

FIG. 8 illustrates another example, where processor 202 maintains a list 800 of tasks by performing method 900 in FIG. 9. The tasks can progress in the sequence upwardly in task board 114. The tasks may not overtake each other. A new task will can stay below a task that has been added before. Therefore, it may be sufficient to maintain a list where new tasks are appended and completed tasks deleted from the list. It is within the scope of this discussion that the board is arranged in any manner that indicates how long tasks have been on the board.

The list 800 in FIG. 8 comprises three list elements 802, 804 and 806. These elements contain three older tasks 336, 334 and 332, respectively. In one example, list 800 is a list of pointers that point to the corresponding tasks which is meant by the element 'contains' the task.

Processor 202 receives 901 a new task 330, such as by the managing server assigning a new task to workstation 102. Processor 202 then creates a new list element 808 and appends the new list element 808 to list 800. Processor 202 then links the new task 330 to the new list element 808 to thereby append 902 the new task 330 to the list 800 of previously received tasks 802, 804 and 806.

Processor 202 can then use the list 800 to calculate a sum of time estimates as explained above with reference to FIG. 3b. Processor 202 starts from the bottom of list 800, that is, processor 202 sets the index counter to '0' and starts with task 330 at list element 808. Processor 202 then increments the index counter to '1' and proceed to second task 332 at list element 806 to calculate the sum of time estimates of the first task 330 and the second task 332. Processor 202 continues this iteration until the sum exceeds 80% of the sum of time estimates of all tasks in list 800. The value of the index counter when the sum exceeds 80% is therefore a determined 903 position in the list where a sum of time estimates of tasks appended after that position meets a criteria in relation to a sum of time estimates of all tasks in the list.

Processor 202 can then generate 904 a task display comprising an indication of an elapsed time (such as the penetration value) of the task at the determined position. For example, processor 202 calculates a penetration value based on the elapsed time and generates a line or a gradient at a vertical position corresponding to the penetration value.

There are various manners in which to provide for the time estimate that is provided to the buffer of FIG. 3a. For example, where the time estimate is of the effort required, is instead the time estimate of the effort required for only a nominated resource; is instead the time estimate of the effort required for only a nominated resource type (such as "developer"); is instead the time estimate of the effort required for only a nominated resource capability (such as "development"); is instead the time estimate of the effort required for only a nominated resource skill (such as "software testing"). In any event, time estimation can be provided by quantitative time estimation systems and methods of project management systems. Below is disclosed quantitative time estimation systems and methods of project management systems, in particular the x-factor methods and systems.

Many methodologies and systems exist for resource estimation in project planning and some systems can be quite effective where resource requirements can be well defined and predictable. For example, where processes are mechanical, routine repetitive tasks such as laying carpet per square metre, or consumption of resources where historical data allows relatively accurate estimation, such as time for consumption of a tank of fuel during average city driving. Reasonably reliable estimates, particularly time estimates, can be produced using historical data for repetitive or routine tasks.

Estimation of effort (typically measured in time or value based on time estimates) for professional services presents a much more difficult problem due to the nature of the work. For example, in research and development work in a project is often new. A new problem to solve or set of requirements to implement may have no accurate historical body of data from which to infer estimates exists. Further, the execution of the work is highly dependent on the individuals performing the work. This can include individual competence and efficiency, available working hours, task loading and other external factors. Other external factors may include personal problems which may impact on work performance, for example, health or family problems, or work related impacts such as office politics or performance perceptions. All of these factors which may influence the individual performing the work can be highly variable and individualised.

Some known approaches to try to improve estimation accuracy in highly variable environments include detailed definition of work components and estimating based on each narrowly defined component. Project planners start drilling into the task durations attempting to fix the estimation problem, based on the theory that finer granularity enables more accurate prediction—i.e. the more we know, the more accurate the estimate. This approach may be effective if one were dealing with something that is highly predictable or based on historical data, for example when measuring how long it would take for a tank of petrol to be consumed with average city drivers. In this case, one can obtain a distribution to use for estimation from experimental or historical data. However, finer granularity of estimation may not solve the problem, particularly for professional services. Some narrowly defined tasks may be more accurately estimated but others still suffer from high variability as discussed above.

Some known systems aim to solve estimation problems using various statistical methodologies, involving estimating standard deviations around the means. For example, an estimate of five hours being interpreted as a mean of five hours and a probability distribution existing around that mean estimate, typically assuming a normal "bell" curve distribution. Many methods involve some number that is deemed to be a mean, and then some other numbers that are standard deviations. Such systems typically use a three or four point estimation technique, for requiring estimators to try to accurately predict three of four different values for a task—for example, mean, median, mode, standard deviation—giving an estimate of variability about likely/expected outcomes. Several problems with existing statistical estimation methods have been noted when these are applied for estimation of professional services.

First, many methods assume a normal distributions for probability for the outcome, however the probability distributions tend to be skewed. Typically, a time estimate for a body of work has a much higher chance of being longer than a most likely estimate than it has of being shorter than the most likely estimate. Thus, any method based on a standard distribution is flawed, and in reality losses will accumulate and gains are lost.

Second, significant consideration and/or calculation is required for the estimator to derive the three or four point estimation data. However, due to the nature of the work this calculation requires many assumptions—so the estimates may have been estimated using incorrect assumed values and therefore be inaccurate. There is a reluctance to provide such estimates due to the effort and once an estimate is given, pressure to commit to generating the outcome "on time" at the maximal likelihood estimate given.

Third, estimates tend to be optimistic or pessimistic, this may also be influenced by external human factors, such as a project manager putting pressure on staff to provide shorter time/lower cost estimates. When making a consolidated estimate, an over representation of under or over estimators can significantly influence the outcome.

Another problem is network effects whereby some tasks are executed serially but others may be executed in parallel. Estimates in this case are not all additive, serial tasks are additive but others are not. This means additional data is required to enable network effects to be taken into consideration for a consolidated estimate encompassing several tasks. The effort required to model network effects to enable accurate compensation for network effects in estimates is typically not performed and therefore the mathematics used for calculating consolidated estimates is typically flawed. Historical data may be used to regressively determine an empirical value to use for compensation of network effects, but this will only be effective if the amount of parallel and serialism is relatively constant between projects.

Typically the result of these estimation methods and problems is erroneous estimations which can be misleading, when used in project planning management and tracking systems and induce frustration and lack of confidence. There is a need for a more effective estimation system for estimation of effort for integration into project management and tracking systems.

Disclosed are quantitative time estimation methods and systems of a project management system. Utilising a display driver and a processor, methods include rendering for display a sub-task identifier and one or more user input fields for a sub-task representing high confidence assessment of a first time estimate value and a high confidence assessment of a second time estimate value for the sub-task. The second time estimate value is a multiplier or divisor value representing high confidence assessment of variability from the first time estimate value. The disclosed method further includes from user input, the processor generating an associated centre value derived from two of the low end time value, the high end time value and the range width value and the processor aggregating the associated centre value for each sub-task of a task to generate a consolidated quantitative time estimate for the task for utilisation in the project management system.

In a disclosed quantitative time estimation system, the system can include a display driver, a processor and a database. The database can be for storing in a task definition storage location of the database task data representative of one or more defined tasks and wherein each task comprises a plurality of sub-tasks, wherein data elements representative of each of the sub-tasks are separately stored in data fields defined in the database, the data representing each-sub task including a sub-task identifier data element. The display driver can be configured to generate for display on a display screen, a user interface displaying at least one sub-task identifier and provide input fields to input a first time estimate value and a second time estimate value for the sub-task, wherein the first time estimate value is a quantitative value representing high confidence assessment of one end of a time estimate range, and the second time estimate value is a quantitative value representing high confidence assessment of the other end of the time estimate range. The processor can be configured to, in response to receiving data input of the first time estimate value and the second time estimate value, determine using the first time estimate value and the second time estimate value for the sub-task, a low end time value, a high end time value, and a range width value and store the low end time value, high end time value, and range width value as data elements for the sub-task in data fields defined in the database, generate for the sub-task an associated centre value derived from the low end time value and the high end time value and store the associated centre value as a data element for the subtask in a data field defined in the database. The processor can be further configured to provide output representative that an associated centre value has been stored for all sub-tasks of a task and aggregate the associated centre value for each sub-task of a task to determine the consolidated quantitative time estimate for the task. The processor can be further configured to output the consolidated quantitative time estimate for the task for utilisation in a project management system.

The disclosed project management systems and methods include a data base for storing in a task definition storage location, task data representative of one or more defined tasks and wherein each task includes a plurality of sub-tasks. Data elements representative of each of the sub-tasks are separately stored in data fields defined in the database, the data representing each-sub task including a sub-task identifier data element. A processor can be in data communication with the database, the processor configured to automatically update task and sub-task data stored in the database in response to receiving data input indicative of task planning and execution. A display driver can be configured to generate and display on a display screen, a user interface to enable data input to define tasks and sub-task in the task definition storage location of the database, wherein for a project planning phase the display driver can be configured to generate for display on a display screen, a user interface displaying at least one sub-task identifier and providing input fields to input a first time estimate value and a second time estimate value for the sub-task, wherein the first time estimate value is a quantitative value representing high confidence assessment of one end of a time estimate range, and the second time estimate value is a quantitative value representing high confidence assessment of the other end of the time estimate range. The processor can be configured to, in response to receiving data input of the first time estimate value and the second time estimate value, determine using the first time estimate value and the second time estimate value for the sub-task, a low end time value, a high end time value, a range width value and store the low end time value, high end time value, and range value as data elements for the sub-task in data fields defined in the database. The process can furthermore be configured to generate for the sub-task an associated centre value derived from the low end time value and the high end time value and store the associated centre value as a data element for the subtask in a data field defined in the database. The processor can be also configured to provide output representative that an associated centre value has been stored for all sub-tasks of a task, aggregate the associated centre value for each sub-task of a task to determine the consolidated quantitative time estimate for the task, store the consolidated quantitative time estimate. The processor can be further configured to apply the consolidated quantitative time estimate for one or more tasks in an automated task scheduling process.

Figure 10:
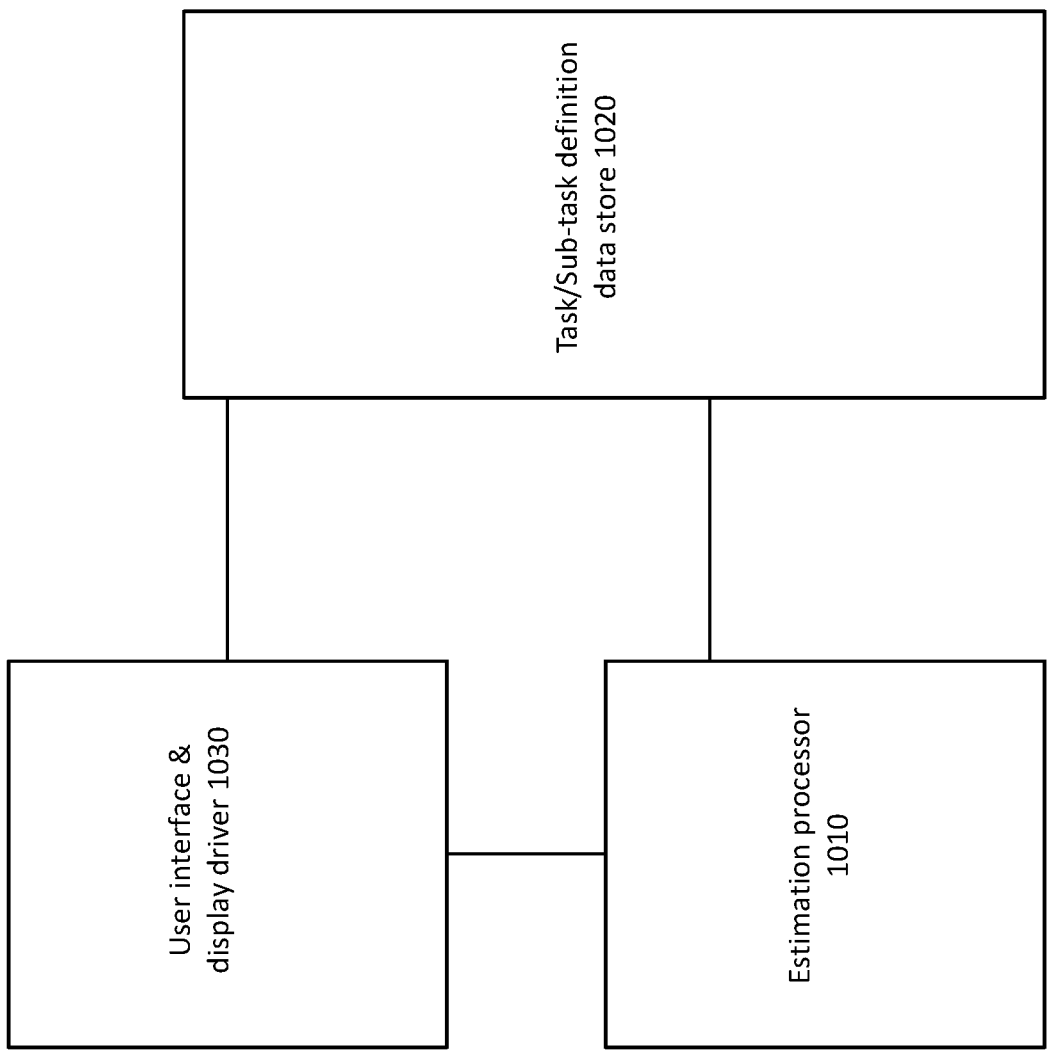
FIG. 10 is a block diagram of an example of an estimation system for use in a project management or work tracking.

The disclosed systems and methods provide a computer system implemented quantitative estimation method and system enabling generation of a consolidated estimate for a task comprising a plurality of sub-tasks. In a first example, as illustrated in the block diagram of FIG. 10, the system comprises an estimation processor 1010 which utilises a task definition 1020 data file or database and a user interface and display driver 1030 to facilitate communication with user terminals or other input and output devices. The task definition data file or database 1020 stores data for one or more tasks broken down into sub-tasks. The estimation processor 1010 is configured to, for each task, trigger the user interface and display driver to cause display of sub-task data to users and receive input of a first value and a second value for each subtask. In response to receiving data input of the first and second values, the estimation processor 1010 determine an estimated range for the sub-task. From these two values only the estimation processor determines, for a range, a low end estimate, a high end estimate, a range width and a centre value. The estimation processor determines a consolidated estimate by aggregating the centre values calculated for each sub-task from the input values for all the subtasks of a task.

Figure 11:
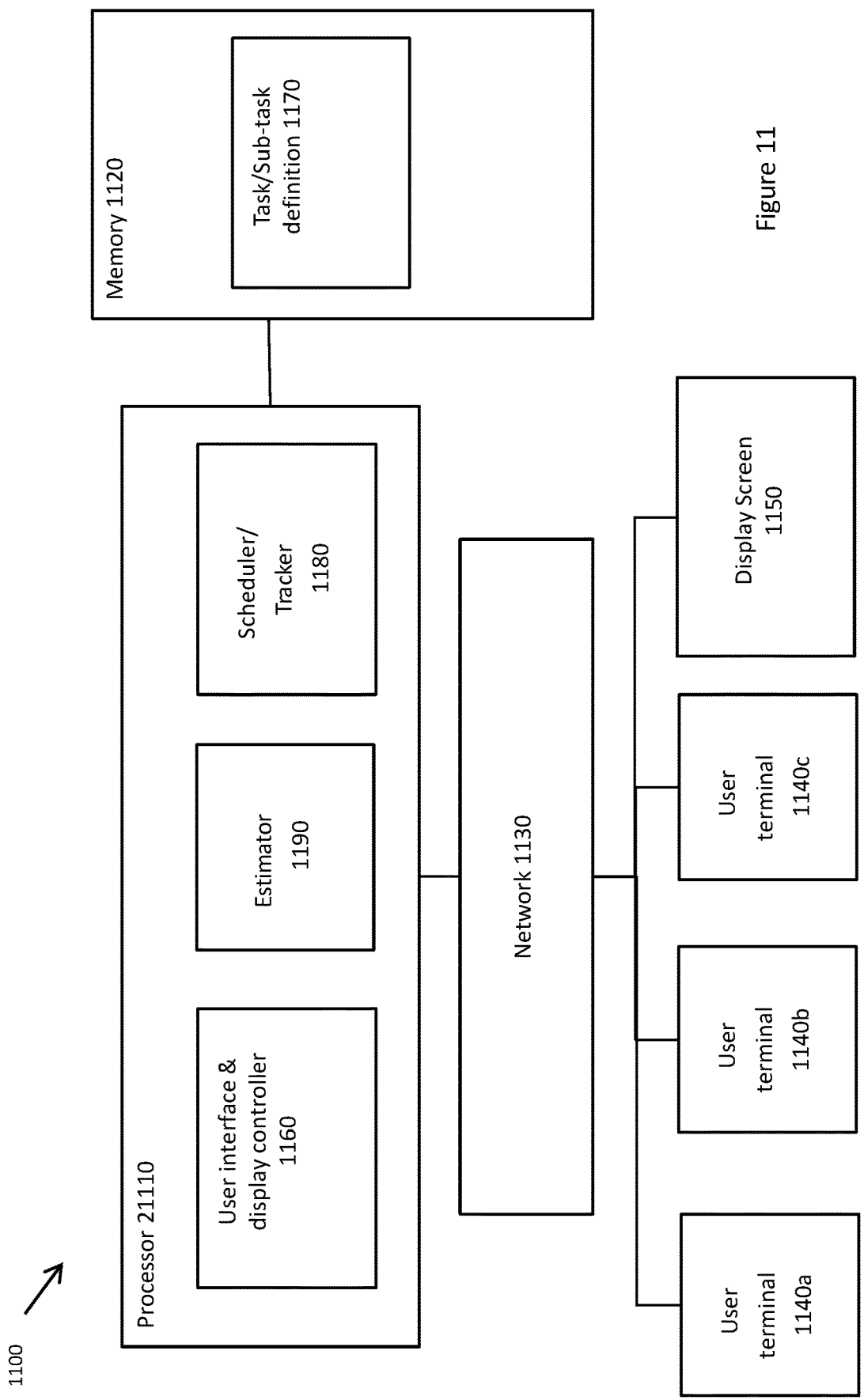
FIG. 11 is a block diagram of an example of a project management and work tracking system including an estimation system.

The disclosed systems and methods can be utilised as an component of a project management or work tracking system or as a standalone estimation system. An example of a project management and work tracking system incorporating an embodiment of the estimation method is illustrated in FIG. 11. The project management and work tracking system is implemented in a computer system environment comprising processor 1110 resources and memory 1120 resources used to implement program system functionality including scheduling of tasks/sub-tasks and tracking execution by a scheduler/tracker 1180 using defined task and sub-task data 1170 and managing acquisition and dissemination of project data from users by a user interface and display controller 1160.

Project tasks are broken down into sub tasks and the task/subtask data 1170 stored in memory 1120, for example as one or more data files or in a database structure. The scheduler/tracker 1180 is configured to enable project data to be entered into the system for initial project definition and project execution tracking. The scheduler/tracker may provide tools to facilitate the initial task definition and subtask breakdown from higher level project specifications and requirements, and task/subtask scheduling. The scheduler/tracker may facilitate task and sub-task definition and storage in a task definition storage location of a database task data representative of one or more defined tasks and sub-tasks. Data elements representative of each of the sub-tasks can be separately stored in data fields defined in the database, the data representing each-sub task including a sub-task identifier data element which can be used to render for display information to allow a user to identify the subtask. The scheduler/tracker may include functionality for automated monitoring and update of project execution data. For example, managers and team leaders may input initial project task and subtask definitions and initial data, the data for these subtasks can be subsequently updated manually or automatically based on activity of project team members, for example in response to deliverable being completed or periodic status updates of work progress input form user terminals and updated in the system memory 1120. The user interface and display controller 1160 is configured to control display of project information to users, (for example, via their user terminals 1140*a-c* or common resources such as a project tracking display screen 1150), outputting of reports, and receipt of input data from users, for example from networked user terminals 1140*a-c*. For example, the user interface and display controller 1160 may be configured to control presentation of a display screen displaying sub-task identification data and data fields allowing input of estimation values, for example estimation of effort required for completion of a task which will typically be a time based estimate. This may include display of graphical user interfaces to assist input of data values, for example displaying duration selection sliders, date selectors etc. manipulable by a user to graphically indicate a numerical value, for example, number of person minutes or hours, calendar based estimates etc.

The user interface and display controller may also be configured to perform data transformation of input data from a file input into alternative file formats or database entries. For example, conversion of a data input in a spreadsheet format to database data entries. Input format conversion may also convert input data from input formats incompatible with other system components into compatible formats. Alternatively an input interface and display controller embodiment may be configured to perform data extraction or data mining to automatically identify project relevant data from monitored inputs or associated systems, for example data mining from change requests, and extraction of project relevant time entries from a timekeeping system. It should be appreciated that the above described examples of project management and work tracking functionality is non-limiting and the different functions implemented by the project management and work tracking system will vary between embodiments and different functions can be implemented to tailor the system for different project environments.

The system can be implemented using a variety of different system architectures. For example, in an embodiment the processor 1110 and memory 1120 resources may be provided by a general purpose computer such as a personal computer (PC), laptop/tablet computer, or server having internal memory including volatile (for example, random access memory RAM, buffers etc.) and non-volatile (hard disk, solid state memory, optical disk etc.) memory resources and optionally external memory resources accessible by the processor via wired or wireless data connections. In alternative embodiments the processor 1110 and memory 1120 resources may be network accessible distributed resources, for example distributed processing and memory resources within a company network, or "cloud based" on demand processing a memory resources accessible via the internet.

In this example the project management system processing 1110 and memory 1120 resources are in data communication with user terminals 1140a-c and other communication resources such as display screens via a network 1130. For example, the network 1130 may be a local area network, such as an Ethernet network or secure WiFi within a company premises, or a secure intranet. Alternatively, the network may be a public network such as a telecommunication network or the Internet. The user terminals 1140a-c may be laptop or desktop computers, tablets or smart phones etc., having input interfaces such as keyboards, touch screens, scanners, transceivers, microphones and sensors (for example, sensors for motion, speed, temperature, humidity, light, location etc.). Output interfaces can include display screens, speakers, printers etc. The types of input and output devices provides at a user terminal can vary between users terminals and many variation of terminals can be supported by any one system embodiment.

The system functionality is implemented in some embodiments as one or more software programs which execute using the processing 1110 and memory 1120 resources as described above and interact with external interfaces of the networked computers 1140a-c. The system may be implemented as software programs or routines executable using the processing 1110 and memory 1120 resources which are accessible via a network 1130 from one or more user terminals which provide user interface capability and local processing capability and memory. In alternative embodiments some system functionality may be implemented using a combination of hardware and software. For example, the network 1130 may be a local area network, such as an Ethernet network within a company premises, or a secure intranet. Different users may be enabled access to the system for specific purposes only. For example, some employees or job categories may be provided with access to view a broad range of data but limited to updating only defined data elements, typically related to work defined for the user. Other users, such as project managers and team leaders may be provided access to enable viewing and updating of broader ranges of data. In some embodiments, updating of some categories of data may be restricted to ensure that only the user to whom work is allocated or an authorised delegate may update the data relating to the work.

The disclosed embodiments may be implemented as a component of a project management system or as a standalone system. An example of an estimation method in accordance with an embodiment is illustrated in the flow-chart of FIG. 12. The disclosed methods and systems provide a quantitative estimation method of generating a consolidated quantitative estimate for a task comprising a plurality of defined sub-tasks. Each task is broken down into a plurality of sub-tasks, the task and sub-task data is stored in a system database or data file. In an embodiment the task and sub-task data is stored in a database accessible to the estimation engine via data communication, for example, via a wired or wireless private network (i.e. Ethernet LAN, WiFi WLAN or combination thereof) or communication network and the Internet.

Figure 12:
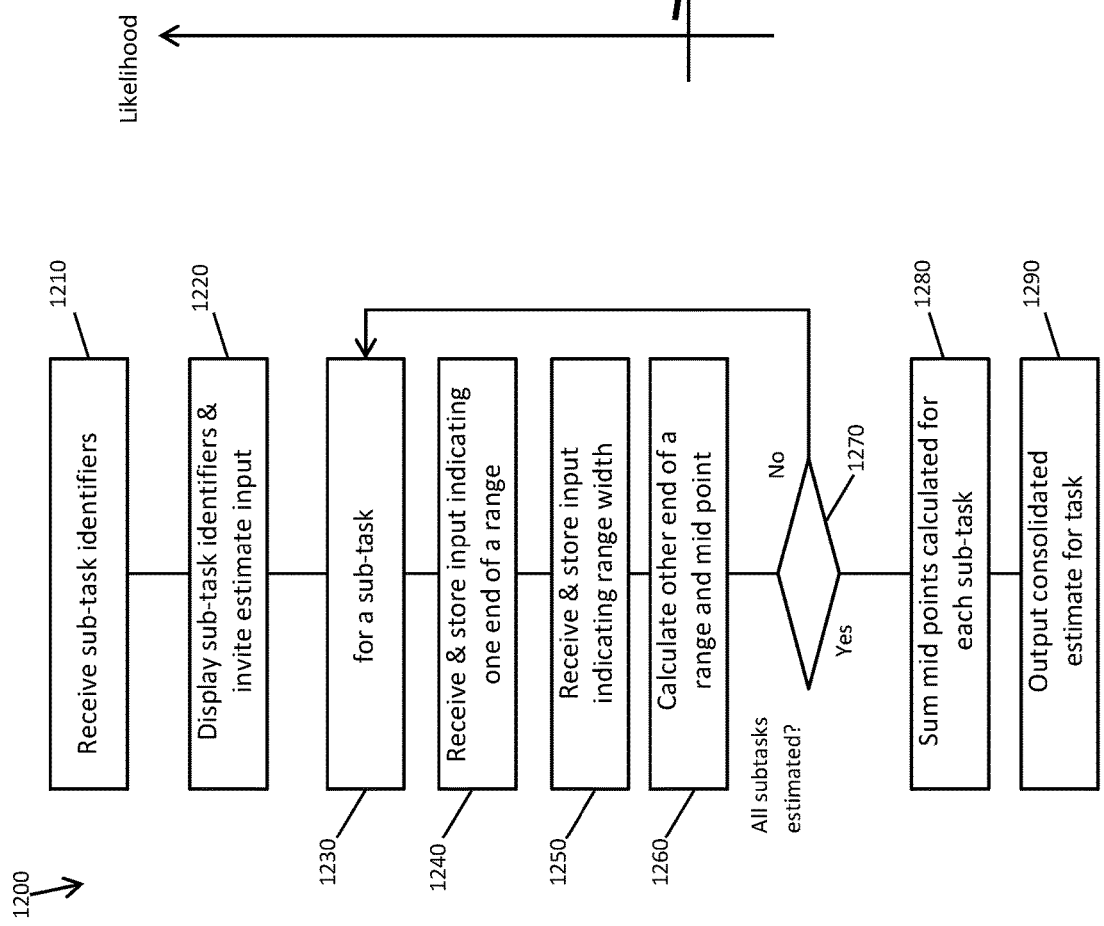
FIG. 12 is a flow chart of an example of a process for providing a consolidated estimate.

As shown in FIG. 12, for each one of the plurality of defined sub-tasks of a task, sub-task identifiers are retrieved 1210 from memory 1120, for example using a database query, or extracted from a data file or lookup table etc. A displayed sub-task identifier can be a numeric, alphanumeric, text, an icon, image or any other suitable indication of the sub-task requiring a time estimate, and may provide access to data relevant to the sub-task, including, for example, descriptive content, available resources, time constraints, physical constraints and associated attributes about the sub-task and/or the task. The data relevant to the sub-task may be displayed in response to a user input such as clicking on an icon or button to expand a window or display additional data fields.

The user interface and display driver 1030 controls the formatting and rendering for display of the sub-task identifiers 1220, so when displayed a user can input time estimate values. The formatting of data for display may include display of data entry fields or cells and instructions for time estimate value entry. The sub-task identifier can be presented in any form that allows a user, typically a responsible person for the sub-task, to recognise the sub-task and input time estimation data. The data defined for each subtask can include a task/sub-task allocation identifier indicating the team member or team to which the task/sub-task has been allocated. For example, using text, numeric, alphanumeric codes, icons, colours, images, maps etc. Effects such as zoom in and zoom out or expansion and collapsing of tasks and subtasks may also be used to allow visualisation of different levels of detail and granularity of tasks and task breakdown during the estimation process. The user interface and display driver can be configured to selectively render for display sub-tasks for a responsible person or based on allocated users for tasks. For example, subtasks for display may be grouped based on team or team member allocated to the sub-task and display of sub-task ordered by team and/or allocated team member, alternatively only tasks/sub-tasks allocated to a team or team member may be rendered on displays/terminals associated with the allocated team.

For each sub-task 1230 the estimation processor 1010 receives and stores in memory a data input indicating a value for one end of a range for the estimate 1240 and a data input indicating range width 1250. In a first embodiment the first time value is a low end estimate for the sub-task and the second time value is a value indicating range width, for example a multiplier. In a second embodiment the first input is a high end time estimate for the sub-task and the second time value is a value indicating range width, for example a divisor. The second value may also be a width value. In a third embodiment the first time value is a low end estimate and the second time value is a high end estimate. In response to receiving input of the first time value and the second time value, the estimation processor calculates from the first time value and second time value for the sub-task a low end time value, a high end value, a range width value and a centre value 1260. In the first embodiment described above the low end time value is multiplied by the multiplier to calculate the high end estimate time value. In the second embodiment described above the high end time value is divided by the divisor to calculate the low end time value. In the third embodiment the high end time value is divided by the low end time value to derive a multiplier indicative of the range width. For each of the embodiments the centre value, which may also be referred to as the standard estimate, can be calculated:

$$\text{center value} = \text{low end estimate} + \text{high end estimate}/2 \quad [\text{Eq. 1}]$$

The steps 1230 to 1260 can be repeated until all subtasks for a task have been completed 1270.

In response to having received and processed the first time value and second time value for all sub-tasks of the task 1270, the estimation processor aggregates the centre value for each sub-task of a task to determine the consolidated quantitative estimate for the task 1280, and outputs the consolidated quantitative estimate for the task 1290. The estimate can also be stored in memory or a database. The consolidated estimate may be output to a user via a user interface. Alternatively or additionally the consolidated estimate can be output to one or more further project management or tracking system components, for example a resource scheduling tool. In some embodiments, data output to the project management and work tracking system can also include any one or more of the low end time estimate, high end time estimate, multiplier/range and centre value for sub-tasks. For example, the subtask estimate values output as a data file, data signal or stored in a database part of or accessible to the project management and work tracking system.

Alternative or additional consolidated estimates are contemplated within the scope of this discussion. For example, the data defined for each subtask can include an allocated user identifier the estimation processor is further configured to aggregate the centre value of each sub-task for an allocated user of one or more task to determine a consolidated estimate for the allocated user.

The above consolidated estimate generation can be repeated for a plurality of tasks, for example a group of tasks making up a body of work, and a further consolidated estimate generated for a plurality of tasks by aggregating the consolidated estimates for each task.

Consolidated estimates may also be prepared based on a team of allocated users or other task attributes, for example project critical path tasks, project phase, physical resource based task or subtask grouping etc.

Embodiments include the estimate range ends and width which are determined from two input subjective values. For example, in one embodiment one value indicates one end of an estimation range and the other value indicates the width of the range. The person responsible for making the estimation, the responsible person, can be instructed to choose the values to input as subjective low granularity estimates, that the responsible person has high confidence that the sub-task outcome can be achieved or delivered within the estimate range. For example, the first value may be a very optimistic estimate, which the user has a high confidence in being a "best case scenario" but not beyond feasibility for execution of the subtask, for example 85-90% confident that a better result will not be achieved. The other value indicative of the width may be indicative of the other end of the range, or a multiplier "n", for example, based on the reasoning that after nominating an optimistic estimate value a pessimistic estimate may be n times the optimistic estimate. For example, 85-90% confident that a "worst case" would not be more than triple the time estimated for the "best case". This estimate input request enables users to input an intuitive "guess" estimate range, using only 2 numbers, which requires little effort to come up with but the responsible person is reasonably certain and prepared to commit to an outcome being achieved somewhere within that range. This system acknowledges that estimation of work is typically inaccurate. Further, by providing an end point and range, or two end points, it is easier for a person to consider other factors which may affect their performance during the task duration, for example state of health, concurrent workload, reliance on external deliverables and other obligation/commitments that may impact on the task execution. Variables and unknowns can be accommodated in the estimation system simply by increasing the multiplier and hence range width.

It should be appreciated that the responsible person, may be an experienced project team making estimates for tasks for which they are responsible for delivering, tasks allocated to that user. The responsible person may also make estimates on behalf of other (typically less experienced or not yet allocated) team members. The responsible person may, in some circumstances, the responsible person may be a notional "responsible person" with the estimate in fact being provided and committed to by a project team. The two estimate values are input by a user, who may be the responsible person or may be another user inputting values with input or under instruction of the responsible person.

Figure 13:
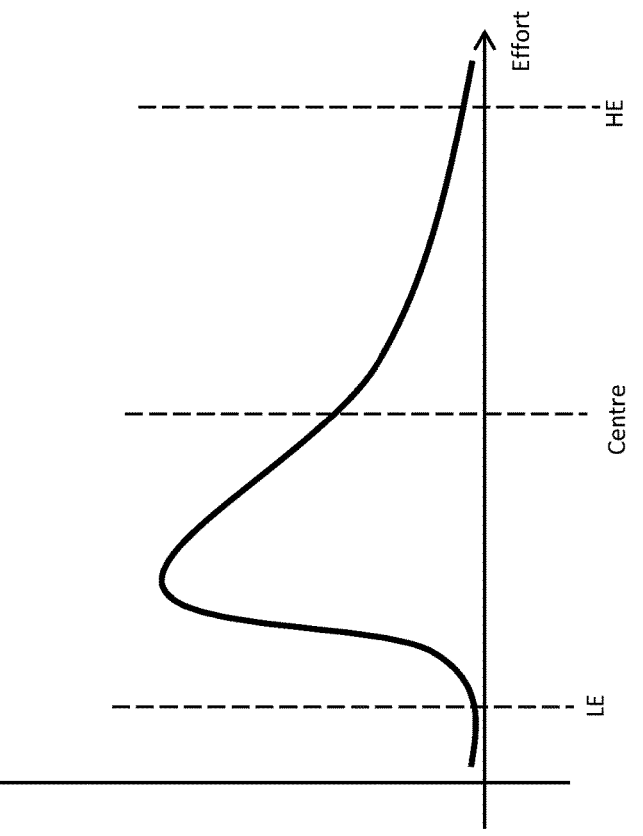
FIG. 13 is an example of a skewed probability distribution.

Embodiments of the methods and systems enable estimates to be made independent of an attempt to characterise or assume a probability distribution of outcomes. From historical and empirical evidence it has been observed that, typically for professional services and in particular software development, task outcome probabilities tend to show a positively skewed distribution (an example is shown in FIG. 13) with a longer tail on the right of the distribution, therefore estimation theories based around normal distributions is typically flawed. Further, the distribution can change from task to task and due to the unknowns for estimation of software projects the actual distribution cannot be predicted with any accuracy in the planning phase of a project.

The disclosed methods and the systems provide a simplified estimation method robust against varying probability distributions. Estimators which may be responsible persons are asked to make a low estimate (90% sure they cannot beat it), which compels one to consider an optimistic and probably lucky low number. Then apply a multiplier, which can be referred to as an "X factor" (a multiplication factor), from which a high end estimate can be derived. In one embodiment the system restricts the multiplier value to being an integer value. The reason an integer value is preferred for a multiplier is because prediction with better accuracy is unlikely without the benefit of hindsight. For example, it may be shown that a correct multiplier was 2.1 with the benefit of hindsight. However, when trying to make predictions humans do not estimate with accuracy. In invoking a predictive and subjective heuristic for coming up with a number, and the method does not suffer the side-effects of the illusion of accuracy and does not suffer from needing historical data. FIG. 13 is an example of a skewed probability distribution indicative of likely time taken for a software project task, the low end (LE) estimate, 85% to 90% confidence a better result would not be achieved, and high end (HE) estimate, 85% to 90% confident the work can be done by this time, are easier to predict and commit to achieving than the mean, median, mode, deviation and skew of the distribution.

An advantage of the disclosed embodiments is that the estimation for a task only requires two numbers, indicative of a range without making any commitment to a "most likely" outcome within that range or assumption of a particular statistical distribution.

Empirical test evidence shows that this estimation system does not seem to suffer as badly from human factors as known previously methods. The reason that it works is that it encourages a responsible person to simultaneously consider the optimistic and pessimistic outcome and give a rating, indicative of a degree of confidence they have in their number. If it is a tight skew, it will have a low multiplier. If it is a long skew, it will have a high multiplier. Thus, a qualitative assessment of the median is provided whilst also providing a qualitative assessment of the spread. So from two numbers, the disclosed systems and methods can determine the range endpoints and width. From these values a fourth value can be calculated, which is the average of the high and the low (the standard estimate). This centre value for sub-tasks is aggregated to provide the consolidated estimate for the task.

Figure 14:
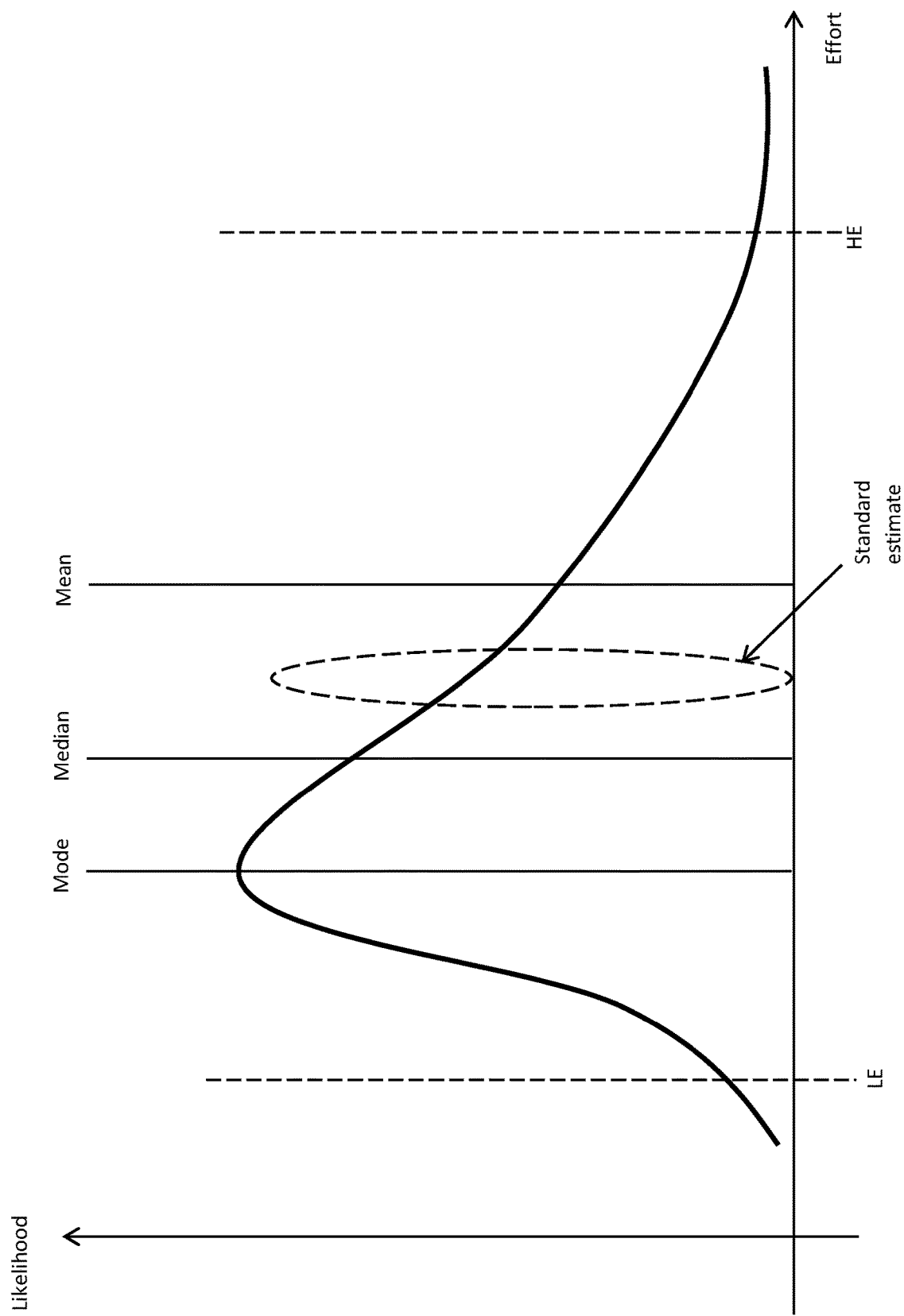
FIG. 14 depicts empirical data in carrying out the described systems and methods.

Additionally, from empirical test evidence illustrated in FIG. 14, it has been found that the standard estimate is likely to be slightly higher than the median and the mode. The empirical test evidence of the standard estimate provides a slightly more paranoid estimate, closer to the likely mean probability.

The applicant has found from test data that even for relatively small sample sizes, around 12-24 people, even though there may be high variety in optimism and pessimism between individual estimators, the aggregated consolidated estimate value has been shown to give a reasonable prediction of the task effort outcome. Test evidence indicates that projects that are estimated using the disclosed methods and systems have been shown to be much easier to bring in on time, than projects estimated using a statistical factor method. The problem with the three or four point statistical estimation methods is that people don't have the data to enable an accurate estimate, but the method provides an (unreliable) illusion of accuracy which can, in turn, lead to unrealistic expectations and frustration.

The disclosed estimation methods and systems starts from a presumption of inaccuracy and acknowledgement of subjectiveness of estimates. By asking for estimators to identify a range that they have high confidence of being able to achieve an outcome somewhere within that band, there is no requirement to specify any "most likely" outcome. The range or band is nominated based on either an optimistic or a pessimistic outcome estimate and an integer multiplier—indicative of variability of the work being estimated. Thus, the estimation values are input independent of any particular probability distribution shape or requirement to commit to any particular value within the band.

The width of the band can be indicative of how confident the estimator is to estimate the work. For example, a low value multiplier is a narrow band indicating low variability between the high and low estimates, whereas a sub-task with many unknowns may have a high multiplier value indicating low confidence in the ability to accurately estimate the required effort. By aggregating mid points of the bands for the consolidated estimates this assumes inaccuracies will "even out" in the end. This method has been found to produce much more commercially useable numbers than any other method the applicant has observed. Further the applicant has used retrospective data to identify estimators who are typically pessimistic and those who are typically optimistic and observed that there is a normalising effect. The optimists are happy to consider the low estimate and a "risky factor", whereas the pessimists are happy to consider the high estimate and a "lucky factor".

Further, empirical evidence has shown that network effects are typically accommodated within the estimates, as the estimates are subjective and estimators can instinctively adjust estimates based on anticipated parallel or serial tasks. For example, allowing extra time between optimistic and pessimistic estimates for tasks that are likely to be worked on in parallel or have some dependency.

Examples of estimation methods and systems have been discussed above with reference to project planning, work task scheduling and tracking which typically use time based estimates. However, the described estimation methods and systems may be employed for estimating values other than time, for example monetary values for professional services where deadlines may be fixed but costs dependent on the resources applied to the tasks. For example, planning deadline based services such as legal or contract services. In another example, for example for delivery or logistics planning estimates may be based on anticipated speed and distance, for example for sea or air freight enabling alternative routing and speed based on environmental factors to be accommodated for in a planning process. It should be appreciated that embodiments of the systems and methods described above may be utilised in a variety of planning and tracking systems.

The disclosed systems and methods can be retrofitted into current or existing scheduling systems making those systems more robust. Current or existing systems may have additional parameters providing computations specific to the industry in which they are applied. Utilising the same or different hardware, the disclosed systems and methods can enhance those systems as a retrofit, improving their results.

In a manufacturing environment or plant, where for example a customisation unit assembles products for specific orders, the products need to move through the manufacturing plant for assembly, and preferably do so in the most efficient and productive manner. Customisation is common, for example, in the computer industry where a buyer orders a computer with a customised specification. In preparing for delivery of that computer, the manufacturer will build the computer for the customer. Tasks for customisation may be without an established time history.

Customisation is common in many businesses and industries where a larger task including sub-tasks or different smaller tasks may be required on short notice and where a history of the time taken for one or more of the sub-tasks is not available. While this example is related to a high tech industry, the same would hold true of any industry. One can consider the same discussion for custom furniture building, framing, construction, landscaping, and so on that may have existing scheduling systems specific to their industries.

In a manufacturing environment, while tasks can be repetitive, their initial establishment can require the time estimation as described herein. The disclosed systems and methods, for example, may be used prior to establishing a history. The history may be found to be equal to the time estimate in accordance with the disclosed systems and methods.

Many different tasks may be involved in a manufacturing process. In the example of custom computer building, the task of building a computer to specification, the sub-tasks may include fetching a component, positioning the component into a computer casing, connecting the component to other components, securing the component within the casing, moving the computer to the next assembly station, and so on. For specific customised orders as described immediately above, different combinations of previously time estimated sub-tasks may be required so the aggregation of those time estimations can be provided by the systems and methods described herein. In this way, the disclosed methods and systems can be retrofitted into existing scheduling systems, changing an existing system to having the capability to build in time estimates and the aggregation in the manner that is described herein, and ultimately, providing a robust outcome for time estimation where history is unavailable.

It may be found in some circumstances that the step of establishing a time history is not necessary when a particular scheduling system is retrofitted with the disclosed time estimation systems and methods. The robustness of the disclosed systems and methods may replace the need to monitor time to establish a historical value. A transformation of an existing scheduling system with a retrofit of the disclosed time estimation systems and methods may eliminate the need for the step of establishing a time history and replacing that with the estimated time based upon the retrofitted system.

It will be understood to persons skilled in the art that many modifications may be made without departing from the spirit and scope of the invention. It should be appreciated that in the context of the present specification the terms "module" and "component" are used to refer to a system component implementing defined functionality. The system component can be implemented as a software program executable using a processor or as a software routine integrated into a software program providing additional functionality. The system component may be equally implemented using a combination of hardware and software. The disclosed embodiments may be implemented using any suitable combination of hardware, software and firmware, and may utilise a combination of shared and dedicated data processing hardware and memory resources. For example, a dedicated hardware circuit, such as an application specific integrated circuit (ASIC) for programmable logic such as a field programmable gate array (FPGA) or programmable logic controller (PLC), may be used to implement some system functionality. This hardware circuit may be used in a data processing system having at least one processor, memory and other resources for executing cooperating firmware and software to support the full functionality of the system and integrate with external systems such as user terminals. It should be appreciated that many alternative system architectures could be used to implement the system and all such alternatives are envisaged within the scope of the present application.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The invention claimed is:

1. A method for displaying multiple tasks, the method comprising:
   determining a penetration value associated with each task based on an elapsed time from an initiation time of that task;
   determining a subset of tasks based on the penetration value and a time estimate associated with each of the multiple tasks in the subset; and
   generating a task display comprising an indication of the subset of tasks,
   wherein
      a sum of time estimates of the tasks in the subset meets a criteria in relation to a sum of time estimates of all of the multiple tasks; and
      the penetration value associated with each task in the subset is less than the penetration value associated with each task outside the subset.

2. The method of claim 1, wherein the criteria comprises a threshold value for a ratio of the sum of time estimates of the tasks in the subset over the sum of time estimates of all of the multiple tasks.

3. The method of claim 1, wherein determining the penetration value comprises determining a percentage of the elapsed time over a display time period.

4. The method of claim 1 wherein tasks are delivered in a sequence to the board in an arrangement that indicates how long the tasks have been on the board being a defined time period wherein the define time period is the associated with determining the penetration value associated with each task based on an elapsed time from an initiation time of that task, the initiation time being the time when a user would have started to work on the task, and the defined time period, the penetration value being derived from the time elapsed since the initiation time of the task as a percentage of the defined time period.

5. The method of claim 1, wherein determining the subset of tasks comprises:
   determining a sorted list of the multiple tasks sorted by penetration value;
   and determining a threshold position in the sorted list that defines the subset as tasks below the separation position.

6. The method of claim 1, wherein determining a threshold position comprises selecting out of the multiple tasks that fail the criteria the task with a minimum penetration value.

7. The method of claim 1, wherein selecting the task comprises iterating over the sorted list in ascending order and adding the time estimates to determine the sum of time estimates until the sum of time estimate fails the criteria.

8. The method of claim 1, further comprising displaying each of the multiple tasks at a location in relation to a display axis, the location indicating the penetration value of that task.

9. The method of claim 1, wherein generating the task display comprises generating a background that is indicative of the subset.

10. The method of claim 1, wherein the background comprises a gradient indicative of a limit of the subset.

11. The method of claim 1, wherein the indication of the subset comprises a numerical value indicative of a minimum penetration value of tasks outside the subset.

12. The method of claim 1, further comprising repeating the method for multiple groups of tasks, each of the multiple groups of tasks being associated with a task performer, wherein generating the task display comprises generating multiple indications of subsets each indication being associated with one of the multiple groups of tasks.

13. A computer system for displaying multiple tasks, the computer system comprising:
an input port to receive an indication of an initiation time and a time estimate associated with each of the multiple tasks;
an output port to communicate with a display device; and
a processor configured:
to determine a penetration value associated with each task based on an elapsed time from the initiation time of that task,
to determine a subset of tasks based on the penetration value and the time estimate associated with each of the multiple tasks in the subset, and
to generate a task display comprising an indication of the subset of tasks and to provide the task display to the display device through the output port,
wherein
a sum of time estimates of the tasks in the subset meets a criteria in relation to a sum of time estimates of all of the multiple tasks; and
the penetration value associated with each task in the subset is less than the penetration value associated with each task outside the subset.

14. The computer system of claim 13 wherein the processor is further configured to determine a subset of a plurality of tasks the subset meeting a criteria in relation to penetration value of all of the plurality of tasks, the criteria having a high end.

15. The computer system of claim 14 wherein the processor is further configured to assess at least one task of the subset that is at the high end of the criteria, the high end criteria representative of a risk assessment to work completion deadlines.

16. The computer system of claim 15 wherein the processor is further configured to provide a visual indication on the display device of the at least one of the task in the subset that is at the high end of the criteria so that from a pre-determined distance away from the display device, the visual indication aspect of the tool providing the ability to determine the risk assessment to work completion deadlines.

17. The system of claim 13 wherein tasks are delivered in a sequence to the display device in an arrangement that indicates how long the tasks have been on the board being a defined time period wherein the define time period is the associated with determining the penetration value associated with each task based on an elapsed time from an initiation time of that task, the initiation time being the time when a user would have started to work on the task, and the defined time period, the penetration value being derived from the time elapsed since the initiation time of the task as a percentage of the defined time period.

18. The system of claim 13 wherein the tasks are delivered to the display device via a task management system such defining the initiation time.

19. The system of claim 16 wherein the visual indication on the board is a colour change in the background upon which specific task data is drawn relating to the one task of the subset at the high end of the criteria, such that the background colour upon which the data about tasks with lower penetration values is drawn is different than the background colour upon which the data about tasks with higher penetration values is drawn.

20. The system of claim 19 wherein the visual indication on the board is a fade line.

* * * * *